(12) United States Patent
Li et al.

(10) Patent No.: US 10,969,058 B2
(45) Date of Patent: Apr. 6, 2021

(54) CONTINUOUS SUPPLY PRECISION MINIMUM QUANTITY LUBRICATION PUMP SUPPORTING DIFFERENT LUBRICATION CONDITIONS

(71) Applicant: QINGDAO UNIVERSITY OF TECHNOLOGY, Shandong (CN)

(72) Inventors: Changhe Li, Qingdao (CN); Yanbin Zhang, Qingdao (CN); Dongzhou Jia, Qingdao (CN); Min Yang, Qingdao (CN); Naiqing Zhang, Qingdao (CN); Heju Ji, Qingdao (CN); Zhaorong Bing, Qingdao (CN); Yali Hou, Qingdao (CN); Qidong Wu, Qingdao (CN)

(73) Assignee: QINGDAO UNIVERSITY OF TECHNOLOGY, Shandong (CN)

(*) Notice: Subject to any disclaimer, the term of this patent is extended or adjusted under 35 U.S.C. 154(b) by 393 days.

(21) Appl. No.: 16/094,003

(22) PCT Filed: Feb. 2, 2018

(86) PCT No.: PCT/CN2018/075019
§ 371 (c)(1),
(2) Date: Oct. 16, 2018

(87) PCT Pub. No.: WO2019/075960
PCT Pub. Date: Apr. 25, 2019

(65) Prior Publication Data
US 2019/0301673 A1    Oct. 3, 2019

(30) Foreign Application Priority Data

Oct. 18, 2017 (CN) .......................... 201710971034.9
Oct. 18, 2017 (CN) .......................... 201721342119.2

(51) Int. Cl.
*F16N 13/04* (2006.01)
*F16N 7/38* (2006.01)

(52) U.S. Cl.
CPC ............... *F16N 13/04* (2013.01); *F16N 7/38* (2013.01); *F16N 2250/04* (2013.01)

(58) Field of Classification Search
CPC ......... F16N 13/04; F16N 7/38; F16N 2250/04
See application file for complete search history.

(56) References Cited

U.S. PATENT DOCUMENTS 4,444,292 A * 4/1984 Brown .................... D03J 1/003
                                              139/1 R
5,568,842 A * 10/1996 Otani ....................... F01M 1/02
                                              123/196 AB (Continued)

FOREIGN PATENT DOCUMENTS

CN     102287606 B    3/2014
CN     104520632 A    4/2015

(Continued)

OTHER PUBLICATIONS

Jul. 20, 2018 International Search Report issued in International Patent Application No. PCT/CN2018/075019.

*Primary Examiner* — Michael A Riegelman
(74) *Attorney, Agent, or Firm* — Oliff PLC

(57) ABSTRACT

A continuous supply precision minimum quantity lubrication pump supporting different lubrication conditions, including a pump system, a gas source processor, a driving system, an oil cup, a water pump, a two-position three-way solenoid valve, a water tank and an emulsion storage tank, wherein the processor is connected with the pump system through a bidirectional joint, the oil cup is connected with the pump system through an oil cup joint, the water pump is installed in a driving box body of the driving system and is connected with the pump system through a hose, the water (Continued)

tank and the emulsion storage tank are connected with the two-position three-way solenoid valve, the two-position three-way solenoid valve is connected with the driving system, and the driving system and the water pump are respectively driven by a stepping motor I and a stepping motor II.

12 Claims, 14 Drawing Sheets

(56) References Cited

U.S. PATENT DOCUMENTS

| | | | | |
|---|---|---|---|---|
| 5,597,051 | A * | 1/1997 | Moriya | F01M 1/16 |
| | | | | 123/196 R |
| 6,216,651 | B1 * | 4/2001 | Ishikawa | F01M 3/02 |
| | | | | 123/196 AB |
| 7,571,597 | B2 * | 8/2009 | Delaloye | F01D 25/18 |
| | | | | 184/6.11 |
| 9,222,618 | B2 * | 12/2015 | Donovan | F16N 13/00 |
| 9,388,940 | B2 * | 7/2016 | Conley | F16N 7/38 |
| 2015/0211680 | A1 * | 7/2015 | Conley | F16K 31/508 |
| | | | | 251/129.11 |
| 2018/0149309 | A1 * | 5/2018 | Lee | F16N 11/08 |
| 2019/0301673 | A1 * | 10/2019 | Li | F16N 7/38 |

FOREIGN PATENT DOCUMENTS

| | | |
|---|---|---|
| CN | 205147956 U | 4/2016 |
| CN | 104358996 B | 8/2016 |
| CN | 107631158 A | 1/2018 |
| DE | 102012220298 A1 | 5/2014 |

* cited by examiner (a)

(b)

(c)

CONTINUOUS SUPPLY PRECISION MINIMUM QUANTITY LUBRICATION PUMP SUPPORTING DIFFERENT LUBRICATION CONDITIONS

FIELD OF THE INVENTION

The present invention relates to a minimum quantity lubrication lubricant supply pump in machining, in particular to a continuous supply precision minimum quantity lubrication pump supporting different lubrication conditions.

BACKGROUND OF THE INVENTION

A large amount of emulsion, cutting oil, coolant and the like are used for cooling and lubricating a machining area in the conventional machining, this cooling and lubricating method has a low utilization rate and increases a huge machining production cost, and the scrapped cooling liquid will cause extreme damage to the environment if not treated properly. Dry machining technology is one of the earliest green and environmentally friendly machining technologies, and it originated in the automotive industry. It has been successfully applied to machining such as turning, milling, drilling and boring and the like. It does not simply abandon the cutting fluid completely, but abandons the use of the cutting fluid on the premise of ensuring the machining accuracy of parts and the service life of the cutter. However, the dry machining does not solve the problem of cooling of the cutting area, causing problems such as surface burn of workpieces and deterioration of surface integrity.

It has become an inevitable trend that the pouring emulsion and the dry machining technology is replaced by the minimum quantity lubrication technology, which adapts to the concept of green manufacturing and sustainable development. It refers to a technique in which a minimum quantity of lubricating liquid, water and a gas having a certain pressure are mixed, atomized and are sprayed into the cutting area for cooling and lubricating. The water and the high pressure gas play a cooling function, and the oil acts to lubricate the cutting area and prolong the service life of the cutter. At present, researches on the minimum quantity lubrication technology have made some progress, wherein the design and development of a minimum quantity lubrication supply pump has become an important part of the realization of the minimum quantity lubrication technology. Although many designers have designed minimum quantity lubrication supply pumps, there are still many problems in practical applications. Qingdao University of Technology conducts in-depth research on minimum quantity lubrication equipment, and designs a nano particle jet flow minimum quantity lubrication grinding three-phase flow supply system (patent number: ZL 201110221543.2), which is characterized in that nano-fluid is conveyed to a nozzle through a liquid path, meanwhile a high pressure gas enters the nozzle through a gas path, the high pressure gas and the nano-fluid are fully mixed and atomized in a nozzle mixing cavity and enter a vortex chamber after being accelerated in an acceleration chamber, and meanwhile a compressed gas enters through a vent hole in the vortex chamber, so that the three-phase flow is further rotated, mixed and accelerated, and then the three-phase flow is injected into a grinding area through a nozzle outlet in the form of atomized droplets.

A precision lubrication pump of a minimum quantity lubrication system designed by the Shanghai Jinzhao Energy Saving Technology Co., Ltd. (patent number: ZL 201410610302.0) is characterized in that a lubricant enters a liquid cavity from an oil inlet hole; driven by a compressed air, when the compressed air enters the gas cavity, the pressure at the tail of a piston rod increases; when the pressure is greater than the elastic force of a piston spring at the front end of the piston rod, the piston rod moves forward, a liquid cavity shrinks, and the pressure increases; when the pressure is greater than the elastic force of a spring of a one-way valve, a plug of the one-way valve is opened, and the lubricant is pumped out; the pressure in the liquid cavity is released, and when the pressure is less than the elastic force of the one-way valve spring, the one-way valve spring resets, and the oil outlet hole is sealed; and when the pressure in the gas cavity is released, the pressure at the tail of the piston rod is less than the elastic force of the piston spring, and the piston rod resets. The precision lubrication pump has the advantages of providing a miniature precision pneumatic pump that can accurately supply oil, and being precise in design and suitable for using a variety of lubricants in lubrication devices of metal machining.

The above-mentioned minimum quantity lubrication supply pumps all adopt intermittent oil supply by air pressure, resulting in that the minimum quantity lubrication grinding fluid cannot be continuously and effectively supplied to the cutting area in a flow controllable manner, such that the lubrication effect of a local machining area is not obvious, the cutting force and the cutting temperature are not stable, the local surface quality of the workpiece is poor, etc. Moreover, in the actual machining process, the tooling machining parameters are required, even if the mixing ratio and the flow rate of the oil-water-gas three-phase flow are adjusted, the pouring cooling is still required in extreme working conditions. Due to the characteristics of pneumatic liquid supply and manual adjustment of the above equipment, the minimum quantity lubrication cannot be intelligently adjusted according to the working conditions and becomes a bottleneck of application. In addition, the use of pneumatic driving in parallel with a machine tool poses a safety hazard to the operation of the machine tool system and is a problem that cannot be ignored.

A continuous liquid supply type minimum quantity lubrication device designed by the Zhejiang University of Technology (patent number: ZL 201520865159.X) is characterized in that the device includes a peristaltic pump, a gas source processor, a gas-liquid joint, a gas source gas pipe, an input gas pipe, a liquid conveying hose, a liquid outlet hose, a gas-liquid coaxial pipe, a nozzle, and a box for mounting the above-mentioned components, the gas source processor is fixedly installed on the outer side of the box body, the inlet of the peristaltic pump is connected with a container for accommodating cutting fluid through the liquid conveying hose, and the outlet of the peristaltic pump is connected with a first inlet of the gas-liquid joint through the liquid outlet hose; the inlet of the gas source processor is connected with the gas source gas pipe, and the outlet of the gas source processor is connected with a second inlet of the gas-liquid joint through an input gas pipe; an outlet of the gas-liquid joint is connected with the nozzle through the gas-liquid coaxial pipe, and compressed air and the cutting fluid are mixed in the nozzle to form atomized cutting fluid, and spray the same. The utility model has the characteristics of compact structure, simple and convenient operation, precise oil quantity control, continuous supply of the cutting fluid, convenient installation and the like.

However, although the use of the peristaltic pump solves the problem of discontinuity of the liquid supply, the accuracy of the liquid supply is uncontrollable due to the characteristics of the peristaltic pump, and the intelligent supply of the minimum quantity lubrication lubricant is not realized.

SUMMARY OF THE INVENTION

In order to solve the shortcomings of the prior art, the present invention provides a continuous supply precision minimum quantity lubrication pump supporting different lubrication conditions. The device is driven by a stepping motor, realizes intelligent switching of various lubrication conditions, oil-water-gas three-phase mixing ratio and intelligent flow adjustment, and continuous and precision supply of lubricant to a machining area and other functions, improves the lubrication effect of the machining area and the surface quality of the workpiece machining, and provides an equipment support for the intelligent supply of minimum quantity lubrication.

In order to achieve the above objectives, the technical solution of the present invention is as follows:

A continuous supply precision minimum quantity lubrication pump supporting different lubrication conditions includes a pump system, a gas source processor, a driving system, an oil cup, a water pump, a two-position three-way solenoid valve, a water tank and an emulsion storage tank; the pump system includes a pump body, an oil inlet cavity is formed in the upper side of the pump body, the oil inlet cavity is connected with two piston cylinders arranged in the pump body in parallel, a piston cylinder inlet is formed in the back side of each piston cylinder, a piston cylinder outlet is formed in the front side of each piston cylinder, the piston cylinder inlet is connected with a piston device, the piston cylinder outlet is connected with a pump body output hole through an oil passage connection horizontal hole on the lower side, the back side of the pump body output hole is connected with a water hole, the right side of the pump body output hole is connected with a pump body gas source inlet, a pump core is installed in the pump body output hole, the pump core is provided with a mixing cavity, double-ended helical guiding protrusions are distributed in the inner wall of the mixing cavity, the mixing cavity is hermetically connected with the water hole in the axial direction, a pump body overflow valve control hole is formed in the right side of the oil passage connection horizontal hole, and the pump body overflow valve control hole is connected with an oil passage overflow valve;

the driving system is fixed to the back side of the pump body through a connecting bolt, the driving system includes a driving box body, and an inner groove cam, a cam shaft, a driving pinion and a stepping motor I, which are installed in the box body; the stepping motor I is installed and located through a motor fixing side plate on the left side of the driving box body, the driving pinion is installed in cooperation with a motor shaft of the stepping motor I, the inner groove cam is installed on the cam shaft and is engaged with the driving pinion, and two piston devices that alternately reciprocate are further connected to the inner groove cam for cooperation;

the water pump is installed in the driving box body and is sealed at one end by the box body, the water pump includes a water pump body and a water pump end cover, the water pump end cover is installed on the left side of the water pump body to seal the other end of the water pump, a water pump input joint is connected to the back side of the water pump body, the water pump input joint is connected with a pump cavity through a water pump input port, the pump cavity is connected with a water pump output joint on the front side of the water pump through a water pump output port, a driving gear and a driven gear are installed in the pump cavity, the driving gear is located on the lower side of the driven gear and is driven by a stepping motor II, the pump cavity is sealed by a water pump sealing ring, the water pump output port is also connected with a water pump overflow valve control port on the upper side of the water pump body, the water pump overflow valve control port is connected with a water pump overflow valve, and a drain port is further formed in the left side of the water pump overflow valve control port;

the gas source processor is connected with the pump body gas source inlet through a bidirectional joint;

the oil cup is connected with the oil inlet cavity of the pump body through an oil cup joint; and the water tank and the emulsion storage tank are connected with the two-position three-way solenoid valve, and the two-position three-way solenoid valve is connected with a water input joint of the driving box body.

Further, the helical angle of the helical guiding protrusion is a, the value range of $\alpha$ is 10° to 50°, the section of the helical guiding protrusion is triangular, and the protruding height is $\frac{1}{8}$ to $\frac{1}{4}$ of an aperture D of the mixing cavity; and a tangential hole is formed in the pump core, the included angle between the axis line of the tangential hole and the axis line of the pump core is equal to the helical angle of the helical guiding protrusion, the tangential hole communicates the mixing cavity of the pump core with the outer side, a lubricating oil ring cavity formed by the pump core and the pump body output hole in cooperation is located on the outer side, the lubricating oil enters the mixing cavity along the guiding tangential direction of the helical guiding protrusion after passing through the tangential hole and is mixed with water that enters from the axial direction of the mixing cavity.

Further, an output joint and an output gas source fast joint are successively connected outside of the mixing cavity of the pump core, the output joint is provided with external threads and internal threads, the external threads are connected with the pump body output hole, the internal threads are connected with the output gas source fast joint, the output gas source fast joint is provided with an output joint inner hole and output joint gas inlets uniformly distributed in the axial direction, and the output joint gas inlets are used for implementing steering transmission of a high pressure gas.

Further, the outlet end of the mixing cavity is connected with a system output liquid pipe, the outer side of the system output liquid pipe cooperates with the output joint inner hole to form a high pressure gas ring cavity, the output joint inner hole of the output gas source fast joint is connected with a system output gas pipe, the system output gas pipe and the system output liquid pipe form a conveying pipeline in the form of a double-layer casing pipe, wherein the inner layer pipe is used for conveying oil-water mixed two-phase flow, and the outer layer pipe is used for conveying the high pressure gas.

Further, the high pressure gas enters the pump body gas source inlet through the gas source processor, the pump body gas source inlet communicates with the high pressure gas ring cavity, the high pressure gas is divided into two paths after entering the high pressure gas ring cavity, one path is conveyed to the nozzle through the system output gas pipe, and the other path enters the outer pipe of the double-layer pipe formed by the system output gas pipe and the system output liquid pipe through the output joint gas inlet and is conveyed by the outer pipe to the nozzle.

Further, the piston device includes a piston rod, a floating sealing ring, a Y-shaped sealing ring, a cam follower nut and a cam follower, the cam follower is fixed on the back end of the piston rod through the cam follower nut, the Y-shaped sealing ring is fixed on the piston rod, the front end of the piston rod is provided with a ring groove, the diameter of the ring groove is smaller than the small diameter of the floating sealing ring, the length of the ring groove is 1.5 to 2.5 times greater than the thickness of the floating sealing ring, the shaft shoulders on the two ends of the ring groove have different structures, the shaft shoulder close to the upper end has a notch feature, when the piston rod moves forward to supply oil, the floating sealing ring cooperates with the shaft shoulder on the lower end to form seal, and during downward-moving return stroke, the floating sealing ring cooperates with the shaft shoulder with a notch at the upper end, so that the oil enters the piston cylinder from the notch gap.

Further, the oil passage overflow valve includes an overflow valve plug, an overflow valve spring and an overflow valve pressure adjusting rod, which are successively installed in the pump body overflow valve control hole and are fixedly installed through an overflow valve control pipe; and in the oil passage overflow valve, the axial position of the overflow valve pressure adjusting rod is changed by rotating the overflow valve pressure adjusting rod, and the starting pressure of the overflow valve is adjusted by changing the length of the overflow valve spring.

Further, the inner groove cam includes a front face cam groove and a back face cam groove, the front face cam groove and the back face cam groove have the same characteristic curve, but have a phase angle difference of 180°, and the two piston devices respectively cooperate with the front face cam groove and the back face cam groove through the cam follower so as to achieve the alternate reciprocating motion of the piston devices.

Further, the water pump overflow valve includes a water pump overflow valve plug, a water pump overflow valve spring and a water pump overflow valve pressure adjusting rod, which are successively installed in the water pump overflow valve control port and are fixedly installed through a water pump overflow valve control pipe; and in the water pump overflow valve, the axial position of the overflow valve adjusting rod is adjusted by rotating the overflow valve adjusting rod, and the starting pressure of the overflow valve is adjusted by changing the length of the overflow valve spring. Further, an oil return joint is arranged on the oil cup joint, the oil return joint is connected with the oil cup joint to form a three-way type transfer pipe, the oil passage connection horizontal hole is connected with an oil outlet joint on the upper side of the pump body through an oil outlet, and the oil outlet joint is connected with the oil return joint through a hose to form an overpressure backflow passage.

Further, the water tank, the two-position three-way solenoid valve and the outside of the water input joint are successively connected by a hose to form a water supply passage, the inner side of the water input joint is connected with a water pump input joint through a hose, the water pump output joint is connected with the water hole through a hose and a pump body water input joint so as to supply water to the pump system, a drain joint is installed on the drain port, the drain joint is connected with the inner side of a water backflow joint installed on the driving box body through a hose, and a liquid waste tank is connected with the outer side of the water backflow joint. Compared with the prior art, the present invention has the following beneficial effects: The present invention is driven by the stepping motor instead of the pneumatic drive of the lubrication pump of the conventional minimum quantity lubrication system, and the technical bottlenecks of low liquid supply precision and continuous liquid supply failure due to the pneumatic driving. In addition, the stepping motor is used for changing the flow rate of the liquid supply by changing the rotating speed of the motor, furthermore, the mixing ratio and the flow rate of the two-phase flow and the three-phase flow of minimum quantity lubrication can be changed according to the machining process parameters, and an equipment support is provided for automatic regulation and control, and intelligent regulation and control. The present invention significantly improves the cooling and lubricating effect of the machining area and the surface quality of the workpiece machining, and meanwhile, the danger caused by the failure of the pneumatic system of the machine tool is also greatly reduced as the pneumatic driving is not adopted.

On the other hand, different lubrication conditions are required due to different process parameters in the machining. Dry cutting, three-phase flow minimum quantity lubrication, two-phase flow minimum quantity lubrication, even under extreme conditions still require casting lubrication, the current minimum quantity lubrication liquid supply equipment cannot switch between a variety of working conditions. The present invention realizes the intelligent switching among the dry cutting, the two-phase flow minimum quantity lubrication, the three-phase flow minimum quantity lubrication and the casting lubrication working conditions, and the liquid supply flow rate can be adjusted according to the process parameters under the minimum quantity lubrication working condition, the on-demand supply is realized, and energy saving and environmental protection are achieved while ensuring the cooling and lubricating performance of the cutting area.

BRIEF DESCRIPTION OF THE DRAWINGS

The drawings constituting a part of the present application are used for providing further understanding of the present application, and illustrative embodiments of the present application and the description thereof are used for explaining the present application and do not constitute undue limitations to the present application.

Figure 1:
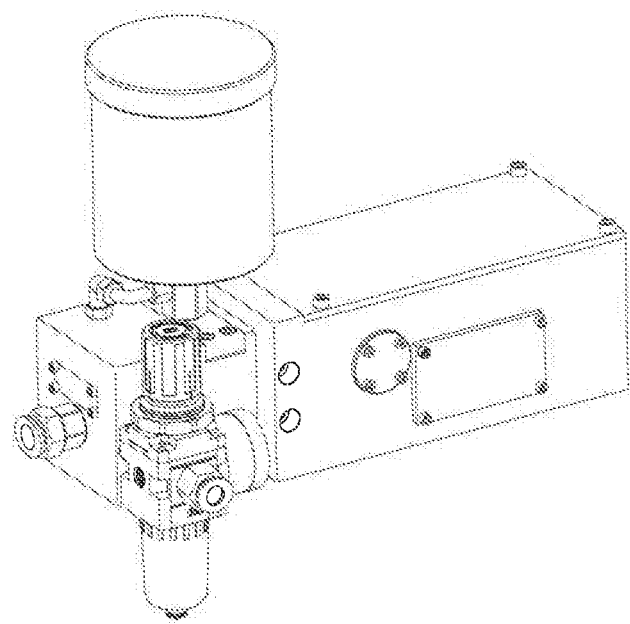
FIG. 1 is an isometric view of a continuous supply precision minimum quantity lubrication pump supporting different lubrication conditions.

Reference signs: pump system 1; two-way joint 2; gas source processor 3; gas source input joint 4; driving system 5; water backflow joint 6; water input joint 7; oil cup 8; water pump 9; two-position three-way solenoid valve 10; water tank 11; emulsion storage tank 12; pump body 1-1; oil inlet cavity 1-1-1; oil inlet cavity screw hole 1-1-2; oil outlet 1-1-3; pump body end cover screw hole I 1-1-4; piston cylinder inlet 1-1-5; pump body water inlet 1-1-6; pump body screw hole 1-1-7; pump body gas source inlet 1-1-8; pump body overflow valve control hole 1-1-9; pump body end cover screw hole II 1-1-10; piston cylinder outlet 1-1-11; pump body output hole 1-1-12; lubricating oil ring cavity 1-1-12-1; high pressure gas ring cavity 1-1-12-2; piston cylinder 1-1-13; water hole 1-1-14; oil passage connection horizontal hole 1-1-15; piston device 1-2; piston rod 1-2-1; floating sealing ring 1-2-2; Y-shaped sealing ring 1-2-3; cam follower nut 1-2-4; cam follower 1-2-5; pump body end cover I bolt 1-3; pump body end cover I 1-4; dustproof ring 1-5; guide ring 1-6; guide ring sealing ring 1-7; pump body water input joint 1-8; oil inlet cavity sealing pad 1-9; oil inlet cavity cover 1-10; oil inlet cavity cover bolt 1-11; oil cup joint 1-12; oil return joint 1-13; output gas source fast joint 1-14; output joint 1-15; output joint inner hole 1-15-1; output joint gas inlet 1-15-2; pump core 1-16; mixing cavity 1-16-1; helical guiding protrusion 1-16-2; tangential hole 1-16-3; pump core sealing pad 1-17; pump body end cover U bolt 1-18; pump body end cover II 1-19; one-way valve seat 1-20; one-way valve spring 1-21; one-way valve plug 1-22; oil outlet joint 1-23; overflow valve plug 1-24; overflow valve spring 1-25; overflow valve pressure adjusting rod 1-26; overflow valve control pipe 1-27; system output gas pipe 1-28; system output liquid pipe 1-29; box body 5-1; connecting bolt 5-2; box body top cover 5-3; top cover bolt 5-4; inner groove cam 5-5; front face cam groove 5-5-1; shaft hole 5-5-2; cam gear 5-5-3; back surface cam groove 5-5-4; cam shaft 5-6; motor fixing side plate 5-7; side plate fixing through hole 5-7-1; motor I fixing screw hole 5-7-2; stepping motor I 5-8; driving pinion 5-9; fastening screw 5-10; deep groove ball bearing I 5-11; shaft end cover 5-12; key 5-13; shaft retaining ring 5-14; water pump body 9-1; water pump overflow valve control port 9-1-1; connecting through hole 9-1-2; pump cavity 9-1-3; water pump sealing ring 9-1-4; water pump input port 9-1-5; water pump output port 9-1-6; driving bearing bore 9-1-7; driven bearing bore 9-1-8; drain port 9-1-9; water pump input joint 9-2; double-hole abrasionproof pad 9-3; driven gear shaft 9-4; driving gear 9-5; driven gear 9-6; single-hole abrasionproof pad 9-7; deep groove ball bearing II 9-8; stepping motor 171 axis 9-9; deep groove ball bearing III 9-10; deep groove ball bearing IV 9-11; water pump end cover 9-12; motor fixing groove 9-12-1; water pump end cover connecting screw hole 9-12-2; motor fixing screw hole 9-12-3; through hole 9-12-4; stepping motor II 9-13; ball key 9-14; drain joint 9-15; water pump output joint 9-16; water pump overflow valve plug 9-17; water pump overflow valve spring 9-18; water pump overflow valve pressure adjusting rod 9-19; water pump overflow valve control pipe 9-20; bearing retaining ring II 9-21; water pump bearing sealing ring 9-22; bearing retaining ring I 9-23; bearing retaining ring III 9-24; air compressor 13.

DETAILED DESCRIPTION OF THE EMBODIMENTS

The present invention will be further described below in conjunction with the g drawings and specific embodiments.

It should be noted that the following detailed description is illustrative and intended to provide a further description of the present application. All technical and scientific terms used herein have the same meanings as commonly understood by those of ordinary skill in the art to which the present invention belongs, unless otherwise indicated.

It should be noted that the terms used herein are merely for the purpose of describing particular embodiments, and are not intended to limit the exemplary embodiments of the present application. As used herein, the singular forms are also intended to include the plural forms, unless the context clearly indicates otherwise, and it is also understood that when the terms "include" and/or "comprise" are used in the specification, they indicate the presence of features, steps, operations, devices, components, and/or combinations thereof.

In the present invention, the orientations or positional relationships indicated by the terms such as "upper", "lower", "left", "right", "front", "back", "vertical", "horizontal", "side", "bottom" and the like are based on the orientations or positional relationships shown in the drawings, and are merely relationship terms used for conveniently describing the structural relationship of the components or elements of the present invention, are not specifically referring to any component or element of the present invention, and may not be construed as limitations of the present invention.

In the present invention, terms such as "fixedly connected", "connected", "connection" and the like should be understood broadly mean that the connection may be fixed connection, can also be integral connection or detachable connection; and can be direct connection and can also be indirect connection via an intermediate medium. The specific meanings of the above terms in the present invention can be determined according to the specific circumstances of the relevant scientific research or technical personnel in the art, and cannot be construed as limiting the present invention.

As described in the background art, the prior art has the problems that the liquid supply is discontinuous, the liquid supply precision is uncontrollable and that the minimum quantity lubrication lubricant cannot be intelligently supplied. In order to solve the above technical problems, the present application provides a continuous supply precision minimum quantity lubrication pump supporting different lubrication conditions, the device is driven by a stepping motor, realizes intelligent switching of various lubrication conditions, intelligent adjustment of the mixing ratio and flow rate of oil-water-gas three-phase flow, precision and continuous supply of lubricant to machining areas and other functions, improves the cooling and lubricating effect of the machining area and the surface quality of workpiece machining, and provides an equipment support for the intelligent supply of minimum quantity lubrication.

Figure 2:
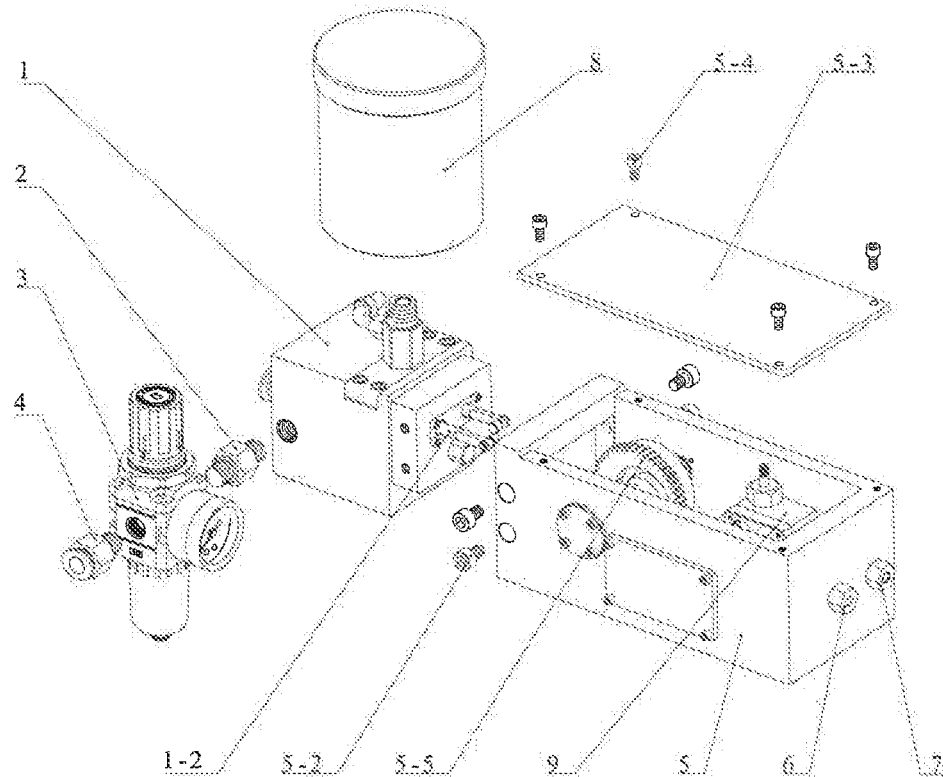
FIG. 2 is an exploded assembly diagram of a continuous supply precision minimum quantity lubrication pump supporting different lubrication conditions.
Figure 3:
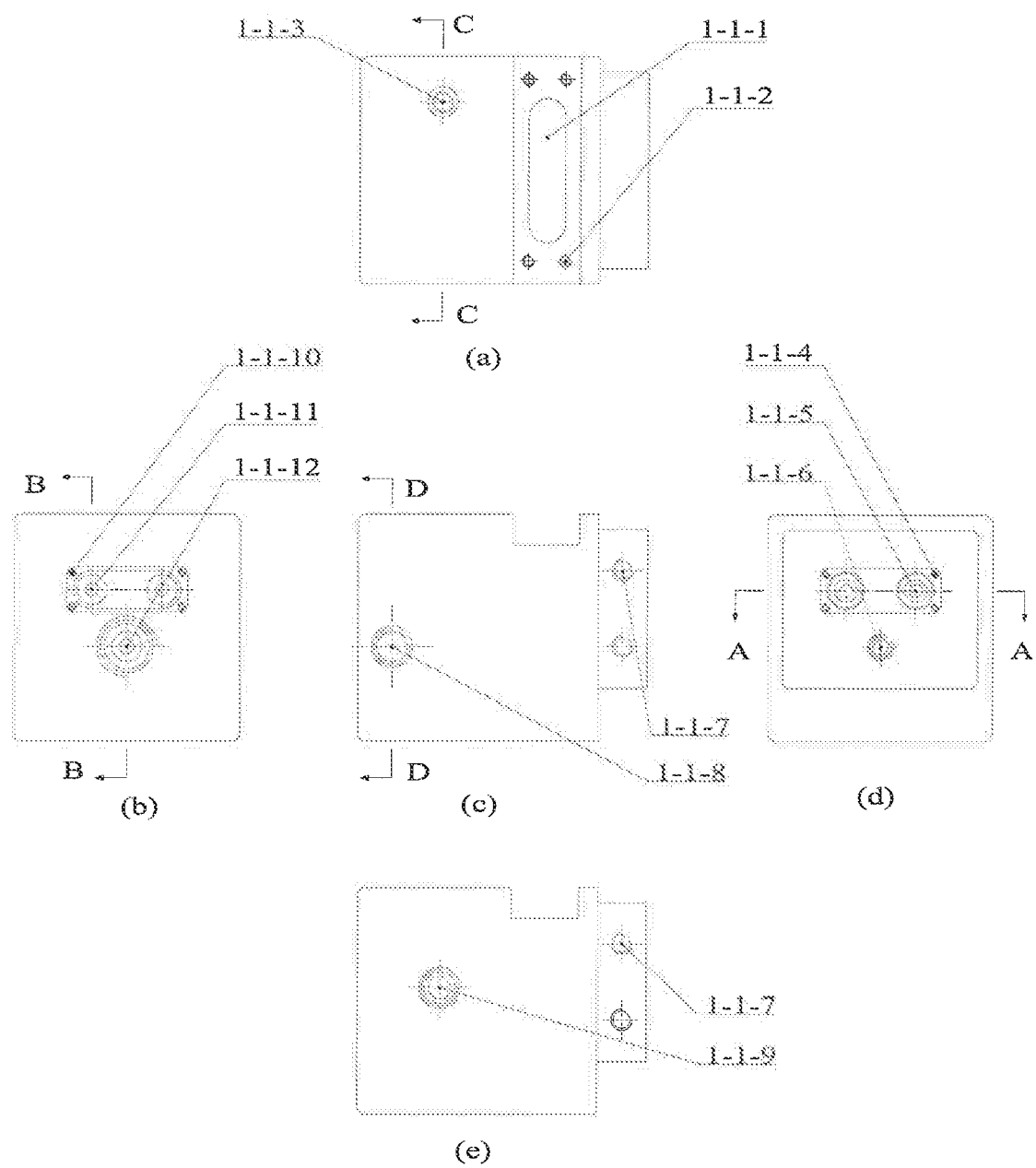
FIG. 3 is a top view (a), a left view (b), a front view (c), a right view (d) and a rear view (e) of a pump body.
Figure 4:
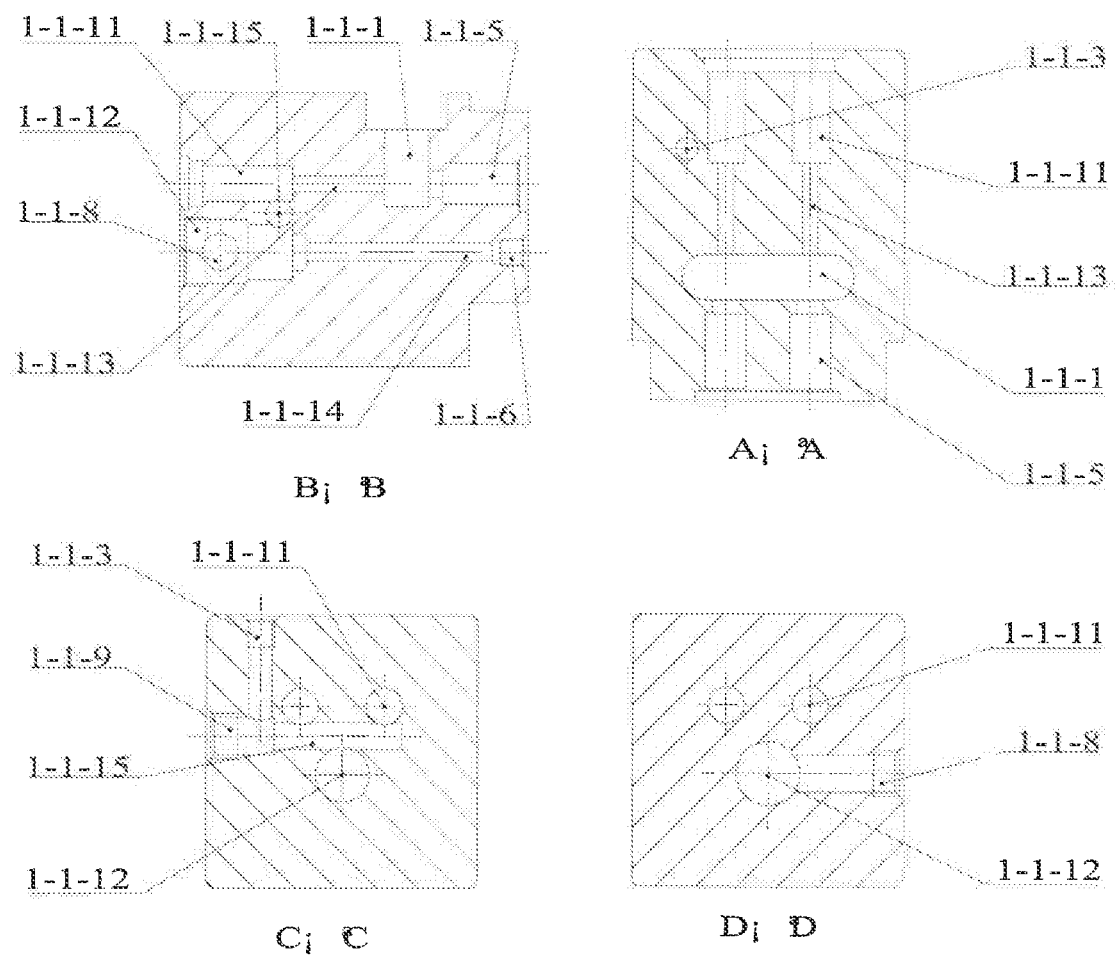
FIG. 4 is a B-B surface section view, an A-A surface section view, a C-C surface section view and a D-D surface section view of a pump body.
Figure 24:
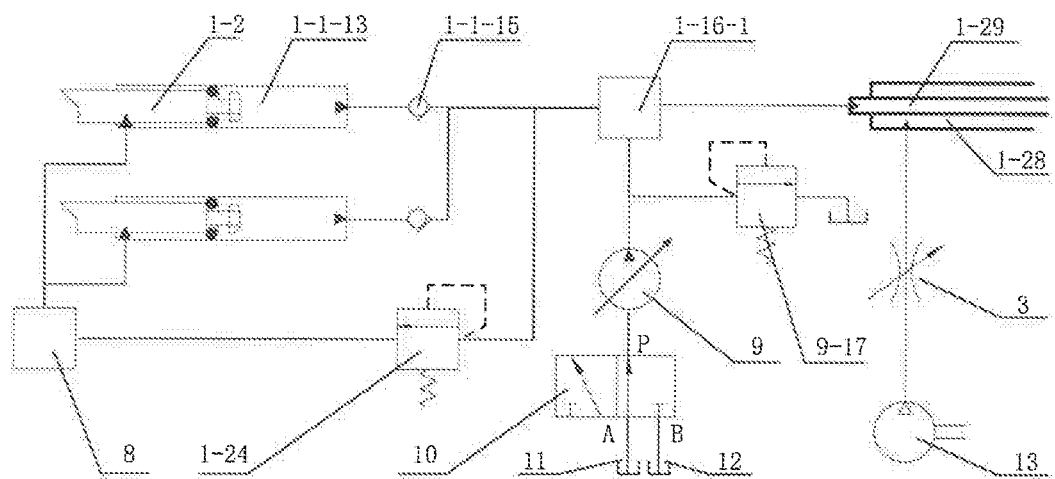
FIG. 24 is a hydraulic and pneumatic system diagram of the present invention.

It can be seen from the combination of FIGS. 1, 2 and 24 that, a continuous supply precision minimum quantity lubrication pump supporting different lubrication conditions includes a pump system 1, a gas source processor 3, a driving system 5, an oil cup 8, a water pump 9, a two-position three-way solenoid valve 10, a water tank 11 and an emulsion storage tank 12.

It can be seen from FIGS. 3 to 6 that the pump system 1 includes a pump body 1-1, an oil inlet cavity 1-1-1 is formed in the upper side of the pump body 1-1, the oil inlet cavity 1-1-1 is connected with two piston cylinders 1-1-13 arranged in the pump body in parallel, a piston cylinder inlet 1-1-5 is formed in the back side of each piston cylinder 1-1-13, a piston cylinder outlet 1-1-11 is formed in the front side of each piston cylinder, the piston cylinder inlet 1-1-5 is connected with a piston device 1-2, the piston cylinder outlet 1-1-11 is connected with a pump body output hole 1-1-12 through an oil passage connection horizontal hole 1-1-15 on the lower side, the back side of the pump body output hole 1-1-12 is connected with a water hole 1-1-14, the right side of the pump body output hole is connected with a pump body gas source inlet 1-1-8, a pump core 1-16 is installed in the pump body output hole 1-1-12, the pump core 1-16 is provided with a mixing cavity 1-16-1, double-ended helical guiding protrusions 1-16-2 are distributed in the inner wall of the mixing cavity 1-16-1, the mixing cavity 1-16-1 is hermetically connected with the water hole 1-1-14 in the axial direction, a pump body overflow valve control hole 1-1-19 is formed in the right side of the oil passage connection horizontal hole 1-1-15, and the pump body overflow valve control hole 1-1-9 is connected with an oil passage overflow valve;

the oil passage overflow valve includes an overflow valve plug 1-24, an overflow valve spring 1-25 and an overflow valve pressure adjusting rod 1-26, which are successively installed in the pump body overflow valve control hole 1-1-9 and are fixedly installed through an overflow valve control pipe 1-27, and the oil passage overflow valve has the functions of overpressure unloading and safety protection; wherein the overflow valve control pipe 1-27 is installed in the pump body overflow valve control hole 1-1-9 through external threads, and the overflow valve pressure adjusting rod 1-26 is matched with the internal threads of the overflow valve control pipe 1-27 through own external threads;

in the oil passage overflow valve, the axial position of the overflow valve adjusting rod 1-26 is changed by rotating the overflow valve adjusting rod 1-26, and the starting pressure of the overflow valve is adjusted by changing the length of the overflow valve spring 1-25;

in specific implementation, a guide ring sealing ring 1-7, a guide ring 1-6 and a dustproof ring 1-5 are successively installed in the piston cylinder inlet 1-1-5, then a piston device 1-2 is installed in a piston cylinder 1-1-13, and finally, the guide ring sealing ring 1-7, the guide ring 1-6 and the dustproof ring 1-5 are located through a pump body end cover I 1-4, and the pump body end cover I 1-4 is cooperatively connected and fixed to the pump body 1-1 through a pump body end cover I bolt 1-3 and a pump body end cover screw hole 11-1-4; and a one-way valve plug 1-22, a one-way valve spring 1-21 and a one-way valve seat 1-20 are successively installed in the piston cylinder outlet 1-1-11 and are located through a pump body end cover II 1-19, and meanwhile, the pump body end cover II 1-19 is cooperatively connected and fixed to the pump body 1-1 through four pump body end cover II bolts 1-18 and four pump body end cover screw hole II 1-1-10.

It can be seen from FIG. 2 that, the oil cup 8 is connected with the oil inlet cavity 1-1-1 of the pump body through an oil cup joint 1-12, and the gas source processor 3 is connected with a pump body gas source inlet 1-1-8 through a two-way joint 2, and meanwhile, a gas source input joint 4 is fixed to the gas source processor 3.

Figure 5:
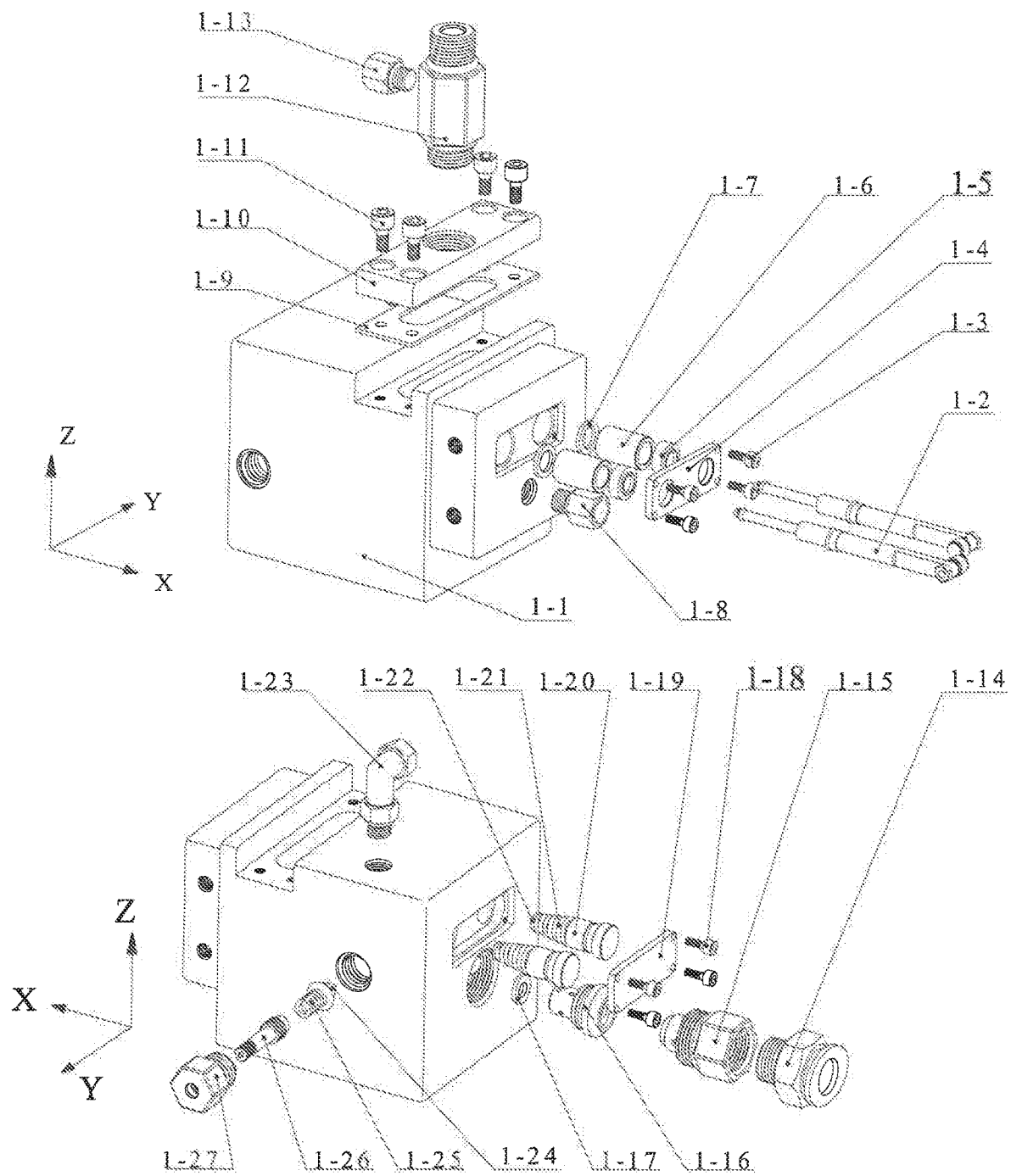
FIG. 5 is an exploded assembly diagram of a pump system.

It can be seen from FIG. 5, in specific implementation, an oil return joint 1-13 is arranged on the oil cup joint 1-12, the oil return joint 1-13 is connected with the oil cup joint 1-12 to form a three-way form transfer pipe, one end of the oil cup joint 1-12 is in threaded connection with the oil cup 8, the other end of the oil cup joint 1-12 is in threaded connection with an oil inlet cavity cover 1-10, the oil cup 8 is fixed on the oil inlet cavity cover 1-10, the oil inlet cavity cover 1-10 is cooperatively fixed on the pump body 1-1 through four inlet cavity cover bolts 1-11 and four oil inlet cavity screw holes 1-1-2, meanwhile, an oil inlet cavity sealing pad 1-9 is clamped between the oil inlet cavity cover 1-10 and the pump body 1-1, and by means of the above settings, the present invention supplies lubricating oil to the oil inlet cavity 1-1-1 through the oil cup 8.

Figure 9:
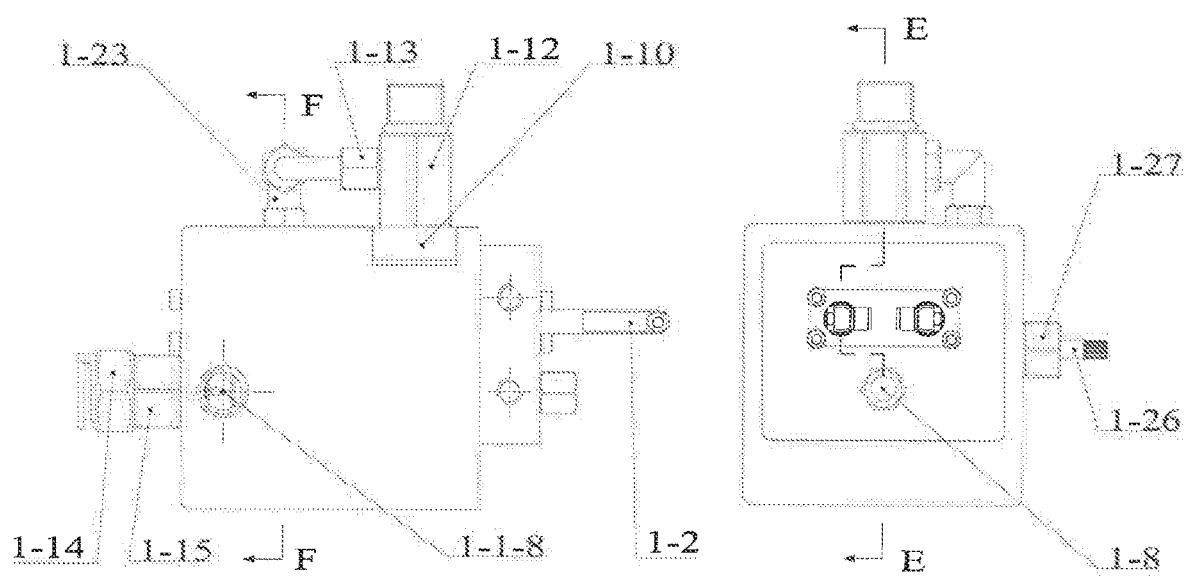
FIG. 9 is a front view (a) and a right view (b) of a pump system.

Similarly, it can be seen from FIG. 9 that the oil passage connection horizontal hole 1-1-15 is connected with the oil outlet joint 1-23 on the upper side of the pump body through an oil outlet 1-1-3, the oil outlet joint 1-23 is fixed on the oil outlet 1-1-3 of the pump body 1-1 through threads and is connected with the oil return joint 1-13 through a hose to form an overpressure backflow passage.

Figure 6:
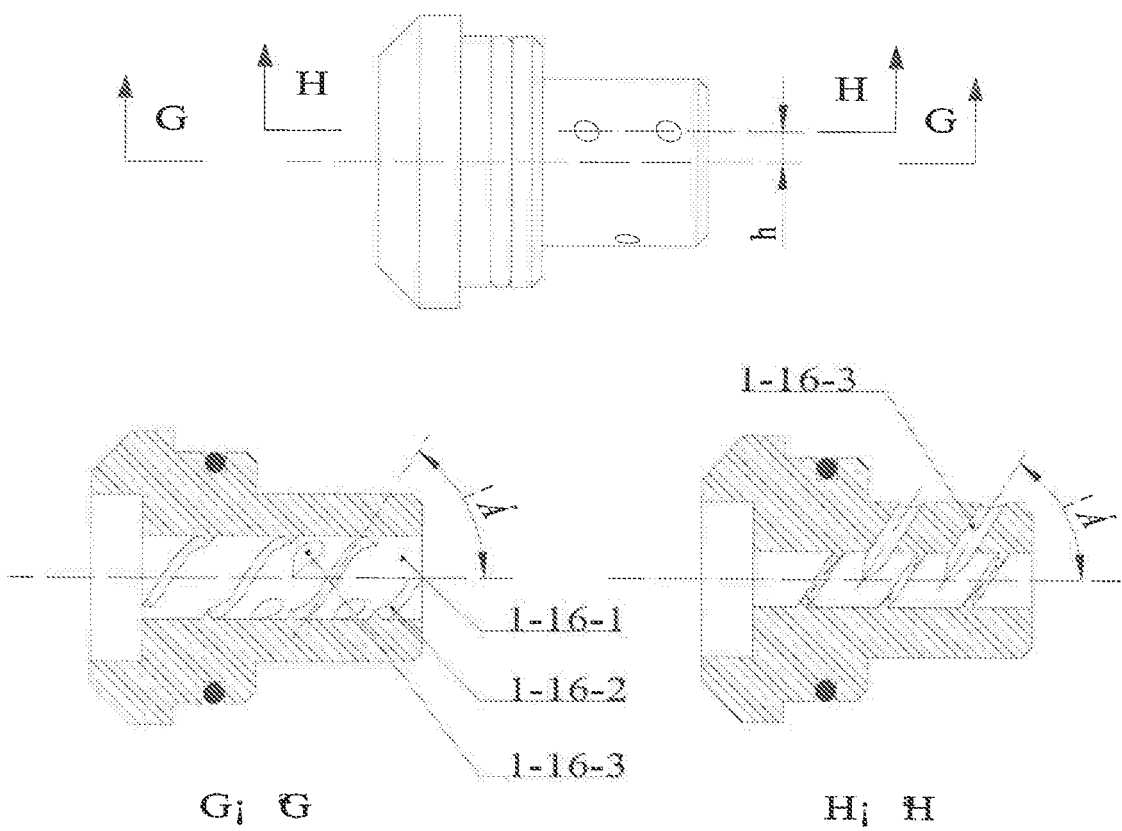
FIG. 6 is a G-G surface section view and an H-H surface section view of a pump core.
Figure 10:
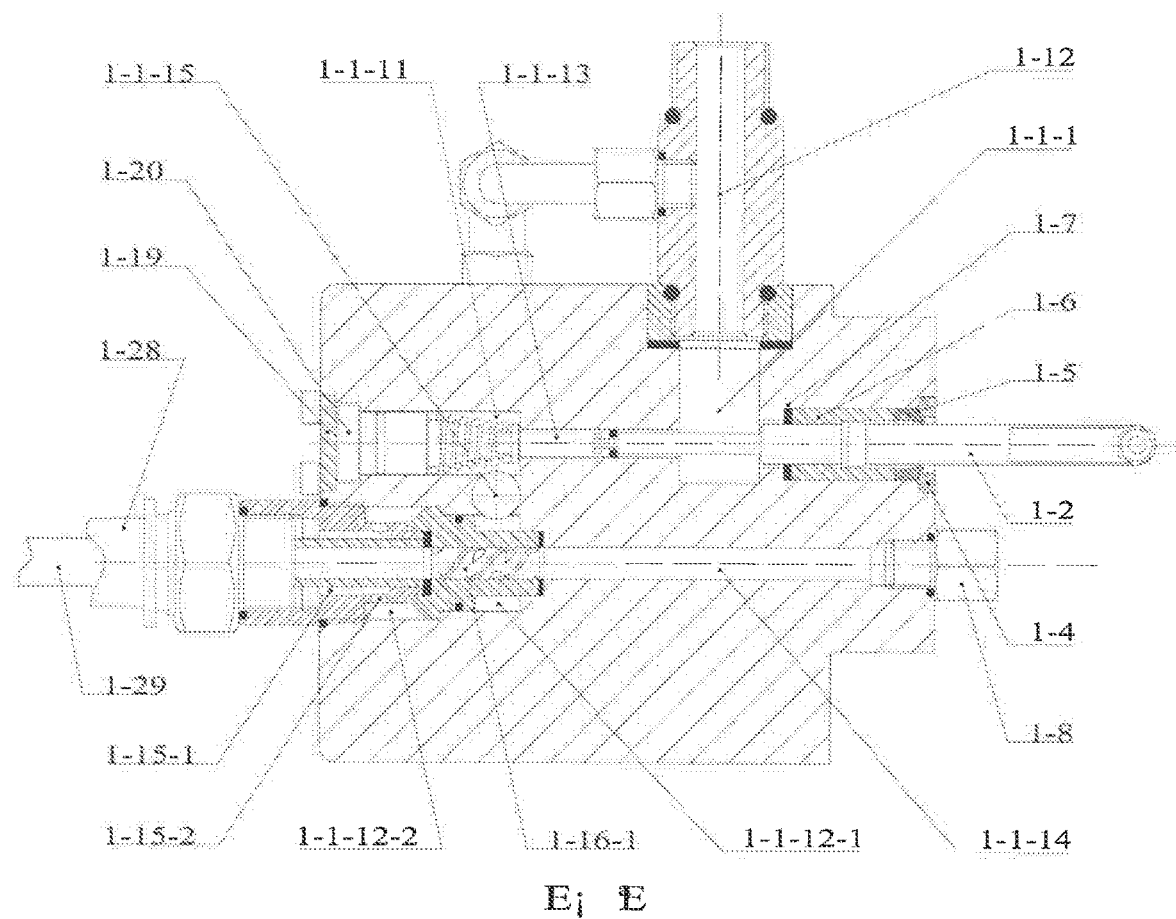
FIG. 10 is an E-E surface assembly step section view of a pump system.

It can be seen from the section view of the pump core 1-16 of FIG. 6 that the helical angle of the helical guiding protrusion 1-16-2 on the inner wall of the pump core is a, the value range of a is 10° to 50°, the section of the helical guiding protrusion 1-16-2 is triangular, the protruding height is ⅛ to ¼ of the diameter D of the mixing cavity 1-16-1, and the helical guiding protrusion 1-16-2 accelerates the flow rate of the two-phase flow in the mixing cavity 1-16-1, increase the mixed flow stroke and greatly improves the mixing effect of the two-phase flow; and six tangential holes 1-16-3 are formed in the pump core 1-16, the distance between the axis line of the tangential hole 1-16-3 and the axis line of the pump core 1-16 on the vertical direction of a vertical view is h, the included angle on the front and back direction is the same as the helical angle of the helical guiding protrusion 1-16-2, the aperture of the tangential hole 1-16-3 is $d=1/\sqrt{6}$, the tangential hole 1-16-3 communicates the mixing cavity 1-16-1 of the pump core with the outer side, it can be seen from FIG. 10 that a lubricating oil ring cavity 1-1-12-1 formed by the cooperation of the pump core 1-16 and the pump body output hole 1-1-12 is arranged on the outer side, the lubricating oil enters the mixing cavity 1-16-1 along the tangential direction of the helical guiding protrusion 1-16-2 after passing through the tangential hole 1-16-3 and is mixed with water entering from the axial direction of the mixing cavity 1-16-1, thereby avoiding the energy loss caused by changing the direction of the fluid. Preferably, h=(D−d)/2, the lubricating oil enters the mixing cavity 1-16-1 along the inner wall, and the mixing effect can be better enhanced.

Figure 7:
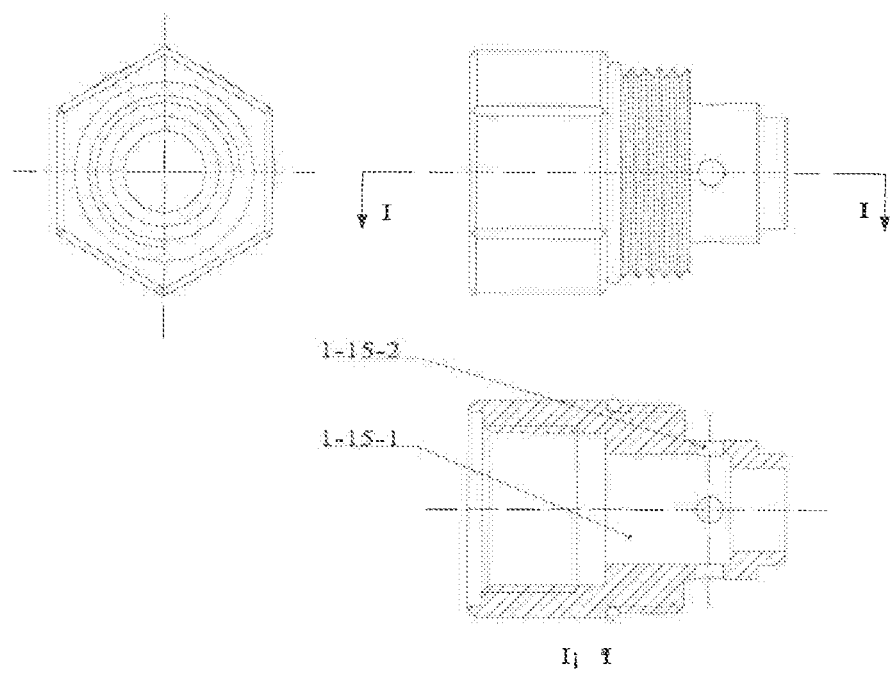
FIG. 7 is a front view (a), a right view (b) and an I-I surface section view of an output joint.

It can be seen in combination with FIGS. 5 and 7 that the pump core sealing pad 1-17, the pump core 1-16, the output joint 1-15 and the output gas source quick joint 1-14 are successively installed in the pump body output hole 1-1-12, the output joint 1-15 is provided with external threads and internal threads, the external threads are connected with the pump body output hole 1-1-12, the internal threads are connected with an output gas source quick joint 1-14, the output gas source quick joint 1-14 is provided with an output joint inner hole 1-15-1 and output joint gas inlets 1-15-2 uniformly distributed in the axial direction, and the output joint gas inlet 1-15-2 is used for the steering transfer of the high pressure gas.

Figure 8:
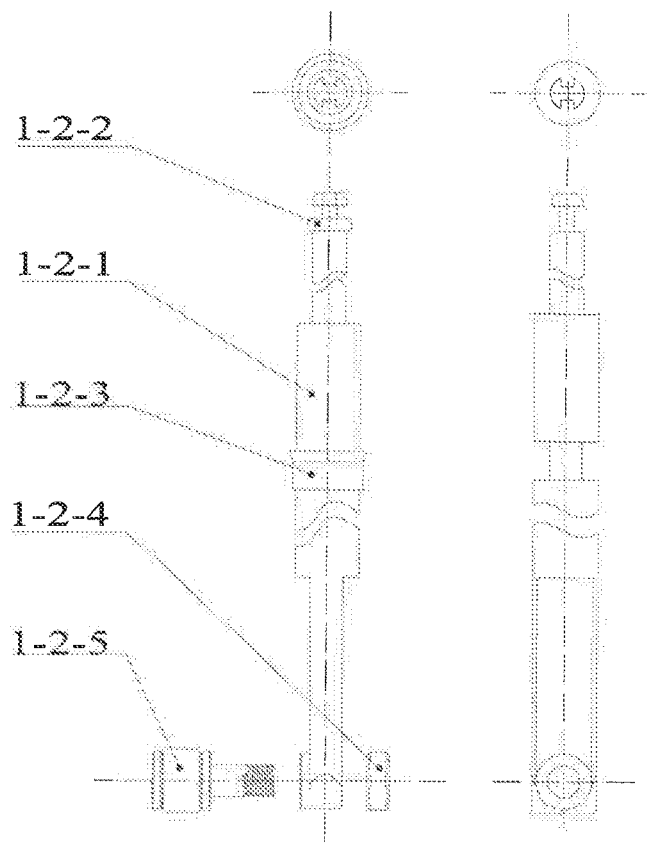
FIG. 8 is a front view (a) and a right view (b) of a piston device.

It can be seen from the front view and the right view of the piston device 1-2 of FIG. 8 that, the piston device 1-2 includes a piston rod 1-2-1, a floating sealing ring 1-2-2, a Y-shaped sealing ring 1-2-3, a cam follower nut 1-2-4 and a cam follower 1-2-5, the cam follower 1-2-5 is fixed on the back end of the piston rod 1-2-1 through a cam follower nut 1-2-4, the Y-shaped sealing ring 1-2-3 is fixed on the piston rod 1-2-1, the front end of the piston rod 1-2-1 is provided with a ring groove, the diameter of the ring groove is smaller than the small diameter of the floating sealing ring 1-2-2, the length of the ring groove is 1.5 to 2.5 times greater than the thickness of the floating sealing ring 1-2-2, the shaft shoulders on the two ends of the ring groove have different structures, the shaft shoulder close to the upper end has a notch feature, when the piston rod 1-2-1 moves forward to supply oil, the floating sealing ring 1-2-2 cooperates with the shaft shoulder on the lower end to form seal, and during downward-moving return stroke, the floating sealing ring 1-2-2 cooperates with the shaft shoulder with a notch at the upper end, so that the oil enters the piston cylinder 1-1-13 from the notch gap.

It can be seen from FIG. 10 that the outlet end of the mixing cavity 1-16-1 is connected with a system output liquid pipe 1-29, the outer side of the system output liquid pipe 1-29 cooperates with the output joint inner hole 1-15-1 to form a high pressure gas ring cavity 1-1-12-2, the output joint inner hole 1-15-1 of the output gas source fast joint is connected with a system output gas pipe 1-28, the system output gas pipe 1-28 and the system output liquid pipe 1-29 form a conveying pipeline in the form of a double-layer casing pipe, wherein the inner layer pipe is used for conveying oil-water mixed two-phase flow, and the outer layer pipe is used for conveying the high pressure gas.

The pipeline in the pump system 1 will be described with reference to FIGS. 9 to 12. In the pump system 1, water enters the water hole 1-1-14 through the pump body water input joint 1-8, and enters the mixing cavity 1-16-1 through the water hole 1-1-14. During normal operation, the lubricating oil enters the oil inlet cavity 1-1-1 from the oil cup 8 through the oil cup joint 1-12, and when the piston device 1-2 returns backward, the lubricating oil enters the piston cylinder 1-1-13 from the oil inlet cavity 1-1-1 by penetrating through the gap in the front end of the piston device 1-2. When the piston device 1-2 supplies oil forward, the floating sealing ring 1-2-2 at the front end of the piston device 1-2 seals the piston cylinder 1-1-13 and the oil inlet cavity 1-1-1, after the oil pressure rises, the oil jacks up the one way-valve chock plug 1-22 to enter the piston cylinder outlet 1-1-11. In the present device, the two piston devices 1-2 work simultaneously and form an alternating phase to achieve continuous oil supply. The piston cylinder outlets 1-1-11 of the two piston systems are both connected with the oil passage connection horizontal hole 1-1-15, and the oil passage connection horizontal hole 1-1-15 communicates with the lubricating oil ring cavity 1-1-12-1. Therefore, the lubricating oil further enters the lubricating oil ring cavity 1-1-12-1 through the oil passage connection horizontal hole 1-1-15, and enters the mixing cavity 1-16-1 after passing through the tangential holes 1-16-3. After the water and lubricating oil are thoroughly mixed in the mixing cavity 1-16-1, the two-phase flow enters the system output liquid pipe 1-29 and is conveyed to the nozzle. The high pressure gas enters the pump body gas source inlet 1-1-8 by the gas source processor 3, and the pump body gas source inlet 1-1-8 communicates with the high pressure gas ring cavity 1-1-12-2, the high pressure gas is divided into two paths after entering the high pressure gas ring cavity 1-1-12-2, one path is conveyed to the nozzle through the system output gas pipe 1-28, and the other path enters the outer pipe of the double-layer pipe formed by the system output gas pipe 1-28 and the system output liquid pipe 1-29 from the output joint gas inlet and is conveyed by the outer pipe to the nozzle.

Figure 11:
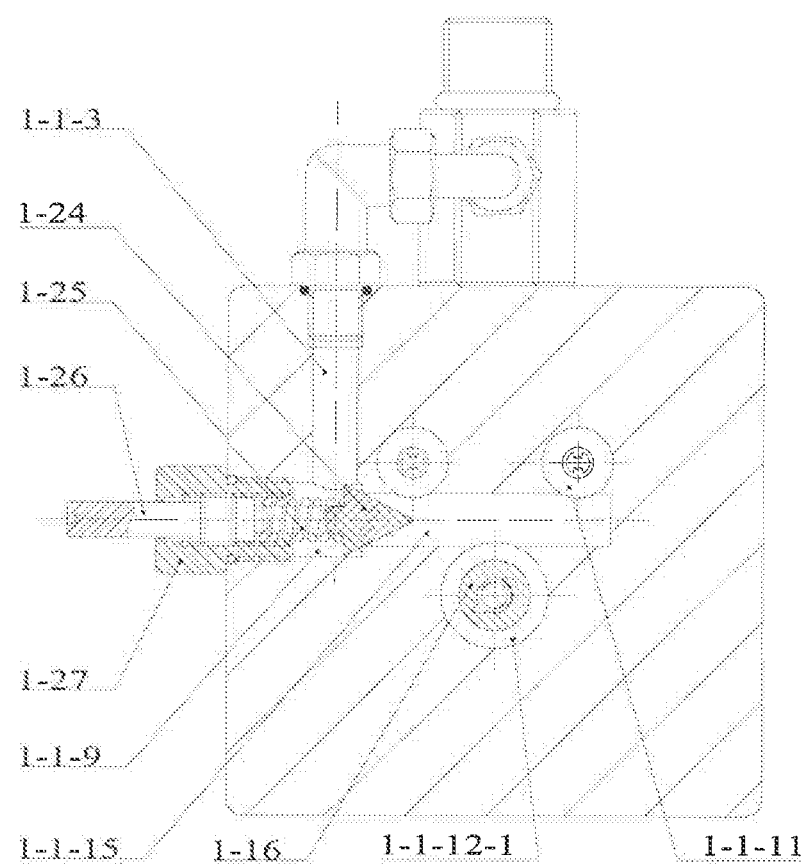
FIG. 11 is an F-F surface assembly full section view of a pump system.
Figure 12:
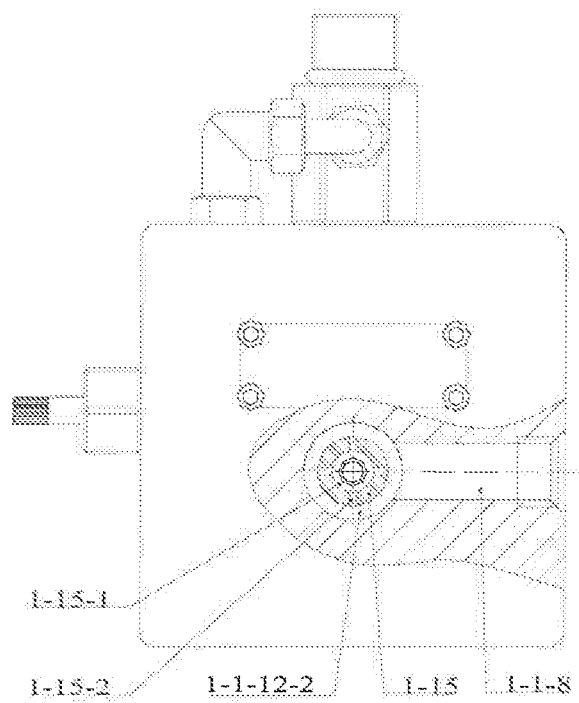
FIG. 12 is a local section view of a pump system.

At the same time, as shown in FIG. 11, when the oil passage is blocked, the lubricating oil enters the connection horizontal hole 1-1-15, forward oil supply is not performed, but the oil jacks up the overflow valve plug 1-24 to enter the oil outlet. 1-1-3, and enters the oil inlet cavity 1-1-1 again through the oil outlet joint 1-23, the hose, the oil return joint 1-13 and the oil cup joint 1-12.

Figure 15:
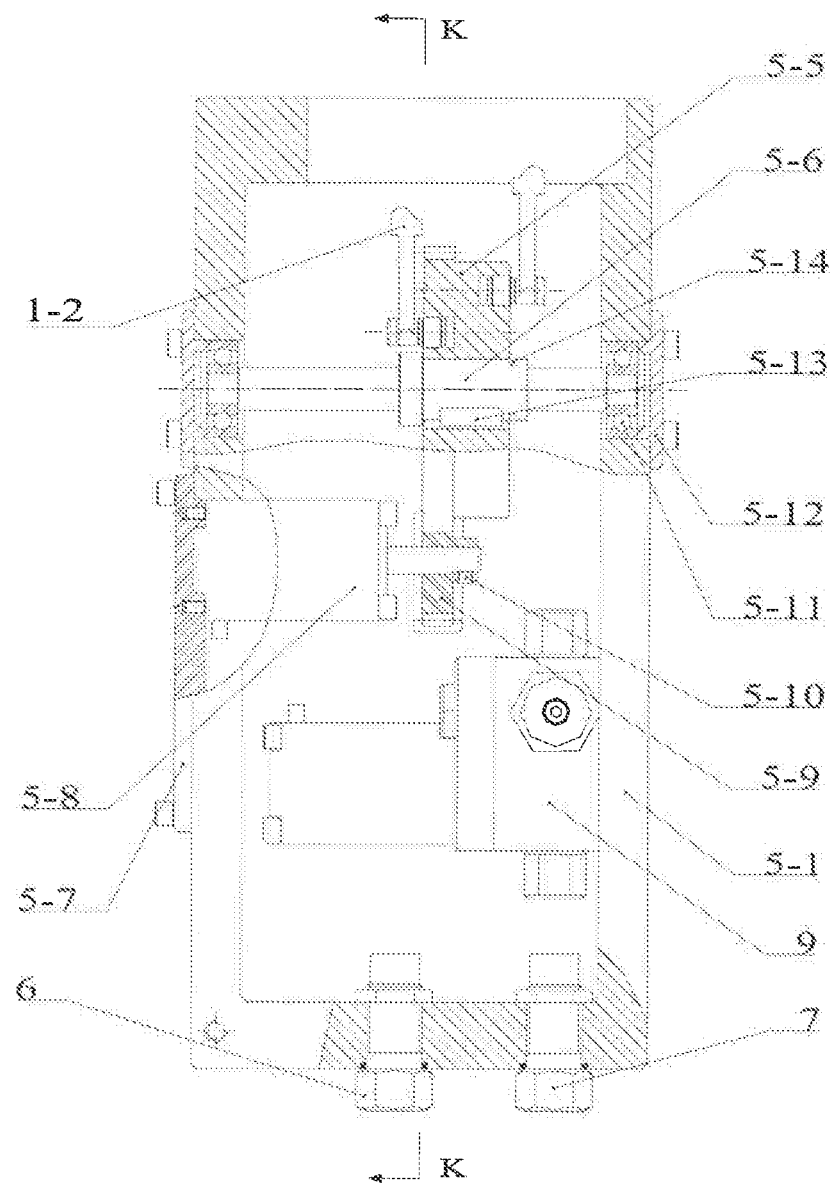
FIG. 15 is a local section view of assembly of a driving system.
Figure 16:
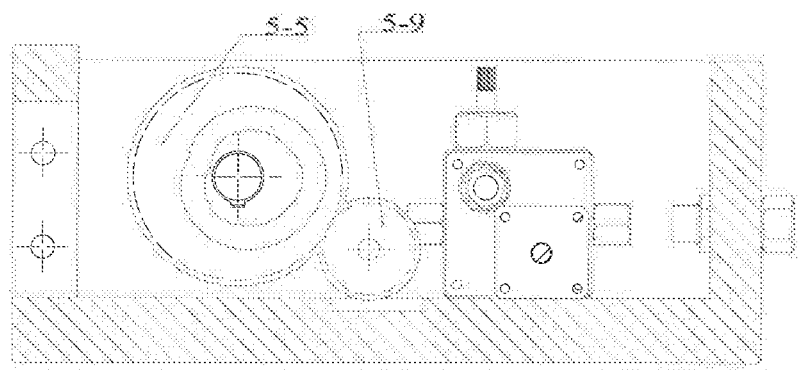
FIG. 16 is a full section view of assembly of an H-H surface of a driving system.

It can be seen in combination with FIGS. 15 and 16 that the driving system 5 is fixed to the back side of the pump body 1-1 through the cooperative connection of a connecting bolt 5-2 and a pump body screw hole 1-1-7, the driving system 5 includes a driving box body 5-1, and an inner groove cam 5-5, a cam shaft 5-6, a driving pinion 5-9 and a stepping motor I 5-8, which are installed in the box body 5-1; the stepping motor I 5-8 is installed and located on a motor fixing side plate 5-7, the motor fixing side plate 5-7 is fixed on the driving box body 5-1 through a bolt so as to install and locate the stepping motor I 5-8, the driving pinion 5-9 is installed in cooperation with a motor shaft of the stepping motor I 5-8 and is located through a fastening screw 5-10, the driving pinion 5-9 is engaged with the inner groove cam 5-5, the engagement relationship is as shown in FIG. 16, the number of teeth of the driving pinion 5-9 is ¼-½ of the number of teeth of the inner groove cam 5-5, the cam shaft 5-6 is installed on the box body 5-1 through a deep groove ball bearing I 5-11 and a shaft end cover 5-12, and the shaft end cover 5-12 is fixed on the box body 5-1 through a bolt, the inner groove cam 5-5 and the cam shaft 5-6 are cooperatively installed, one end of the inner groove cam 5-5 lens against the shaft shoulder of the cam shaft 5-6 in the axial direction, the other end of the inner groove cam is axially located by mounting a shaft retaining ring 5-14, the inner groove cam 5-5 is installed and located with the cam shaft 5-6 through a key 5-13 in the circumferential direction, meanwhile two alternately reciprocating piston devices 1-2 are further cooperatively connected to the inner groove cam 5-5, a box body top cover 5-3 is arranged on the driving box body 5-1, and the box body top cover 5-3 is fixed by a top cover bolt 5-4 so as to achieve system package.

Figure 13:
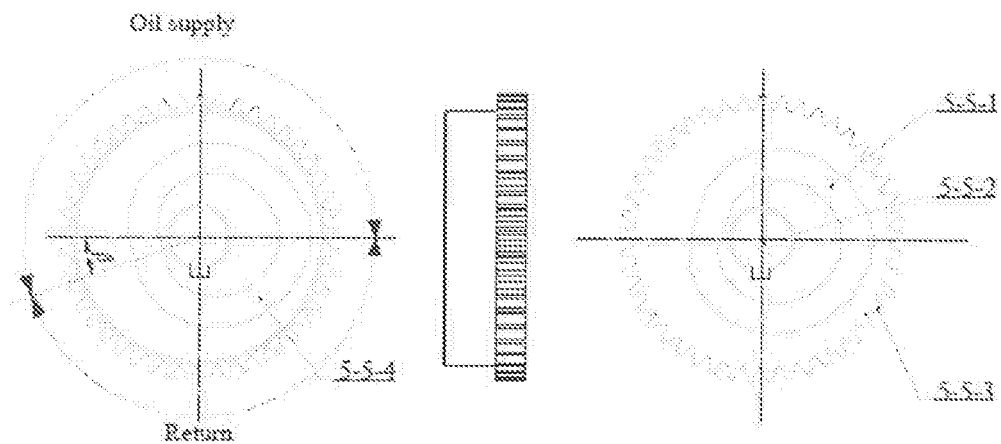
FIG. 13 is a front view (a), a right view (b) and a rear view (c) of an inner groove cam.

It can be seen from the three-view of the inner groove cam 5-5 in FIG. 13 that the inner groove cam 5-5 is a driver of the piston device 1-2, the inner groove cam 5-5 includes a front face cam groove 5-5-1, a shaft hole 5-5-2, cam gear 5-5-3 and a back surface cam groove 5-5-4, the front face cam groove 5-5-1 and the back surface cam groove 5-5-4 have the same characteristic curve, but have a phase angle difference of 180°, the two piston devices 1-2 are engaged with the front face cam groove 5-5-1 and the back surface cam groove 5-5-4 through the cam follower 1-2-5 respectively, thereby realizing the alternate reciprocating motion of the piston devices 1-2.

Figure 14:
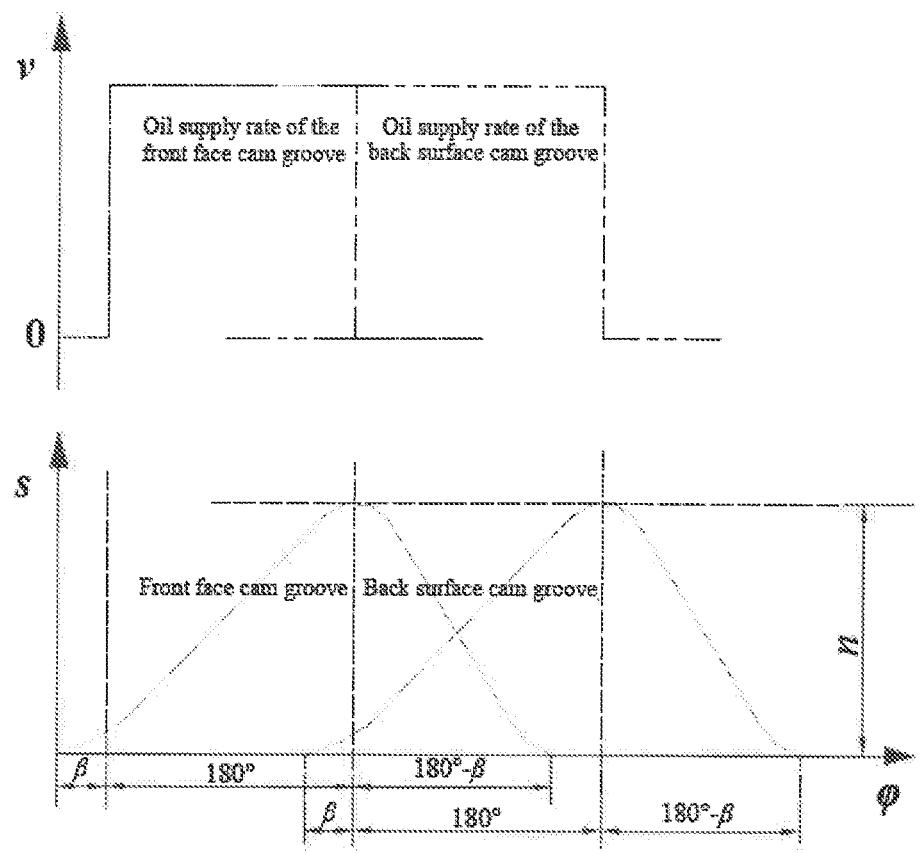
FIG. 14 is a liquid supply curve view (a) and a displacement curve view (b) of a piston.

FIG. 14 is a displacement curve and a liquid supply curve of the piston, and live oil supply is illustrated in conjunction with FIGS. 13 and 14. The characteristic curve of the front face cam groove 5-5-1 and the back surface cam groove 5-5-4 is as shown in FIG. 13, the lift angle is 180°+β, and the backhaul angle is 180°−β. It can be seen in combination with the liquid supply curve of FIG. 14, the cam characteristic curve rises, that is, the piston 1-2 moves forward at the angle 0−β; however, since the section does not cause the oil pressure to reach the opening pressure value of the one-way valve, the oil is not supplied; when the angle reaches β, the oil pressure reaches the opening pressure value of the one-way valve under the action of the piston 1-2, the oil supply is started, at this time, the cam groove on the other surface reaches a backhaul node, so the oil supply curve is still continuous. The value of β is related to the inner diameter of the piston cylinder 1-1-13, the speed of the piston rod 1-2-1, the physical characteristics of the one-way valve spring 1-21, the viscosity and density of the lubricating oil, and other parameters. In addition, the cam groove lift curve is linearly increased to ensure that the oil supply curve is a constant.

Figure 17:
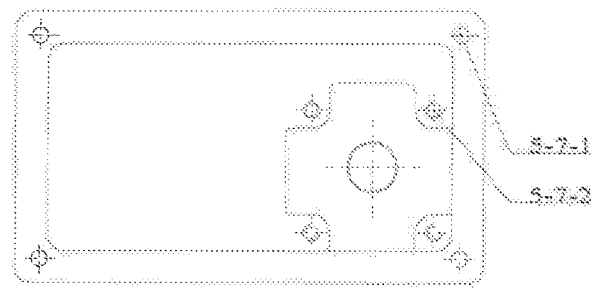
FIG. 17 is a front view of a motor fixing side plate.

FIG. 17 is a front view of a motor fixing side plate. As shown in FIG. 17, the motor fixing side plate 5-7 is provided with a cross groove according to the shape of the stepping motor I 5-8, the stepping motor I 5-8 is located and installed by combining four fixing screw holes 5-7-2, at the same time, the motor fixing side plate 5-7 is provided with four side plate fixing through holes 5-7-1, and the motor fixing side plate 5-7 is located and installed with bolts.

Figure 18:
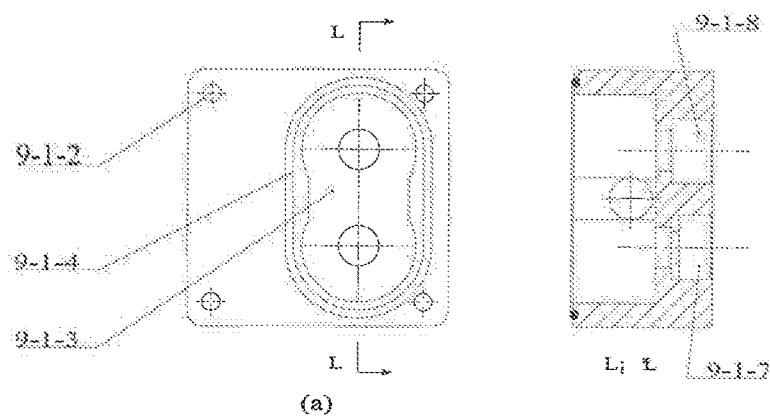
FIG. 18 is a front view (a), a top view (b), a rear view (c), and L-L-surface, M-M surface and N-N surface section views of a water pump body.
Figure 18:
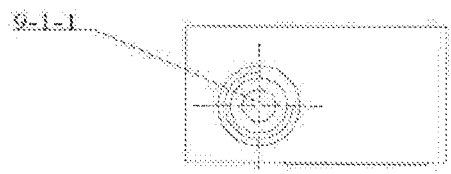
Figure 18:
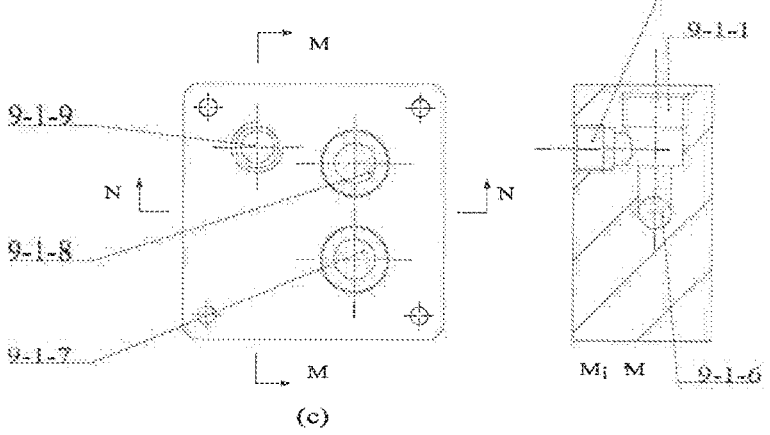
Figure 18:
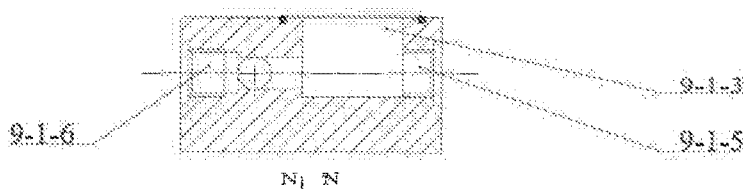

It can be seen from the three-view and the section view of the water pump body of FIG. 18 that the water pump 9 is installed in the driving box body 5-1 and is sealed at one end by means of the box body 5-1, the water pump 9 includes a water pump body 9-1 and a water pump end cover 9-12, the water pump end cover 9-12 is installed on the left side of the water pump body 9-1 to seal the other end of the water pump 9, a water pump input joint 9-2 is connected to the back side of the water pump body 9-1, the water pump input joint 9-2 is connected with a pump cavity 9-1-3 through a water pump input port 9-1-5, the pump cavity 9-1-3 is connected with a water pump output joint 9-16 on the front side of the water pump 9 through a water pump output port 9-1-6, a driving gear 9-5 and a driven gear 9-6 are installed in the pump cavity 9-1-3, the driving gear 9-5 is located on the lower side of the driven gear 9-6 and is driven by a stepping motor II 9-13, the pump cavity 9-1-3 is sealed by a water pump sealing ring 9-1-4, the water pump output port 9-1-6 is also connected with a water pump overflow valve control port 9-1-1 on the upper side of the water pump body 9-1, the water pump overflow valve control port 9-1-1 is connected with a water pump overflow valve, and a drain port 9-1-9 is further formed in the left side of the water pump overflow valve control port 9-1-1.

Figure 19:
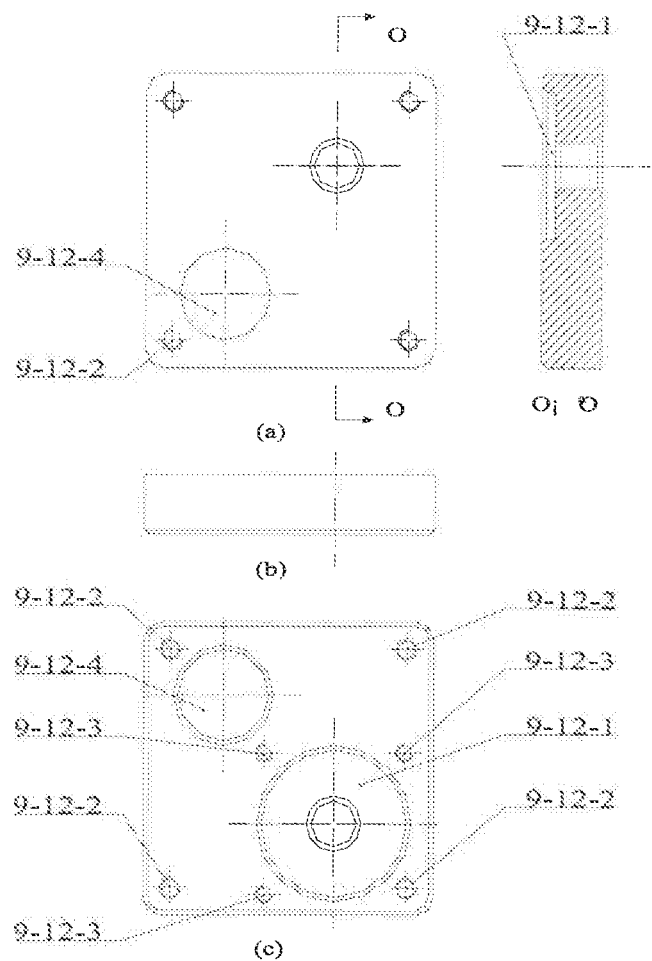
FIG. 19 is a front view (a), a right view (b), a rear view (c) and O-O surface section view of a water pump end cover.

The water pump end cover 9-12 is installed on one side of the water pump body 9-1, and functions as an end cover, and also functions to locate the stepping motor II 9-13. It can be seen from the three-view and the section view of the water pump end cover of FIG. 19 that a motor fixing groove 9-12-1 is formed in the water pump end cover 9-12, the motor fixing groove 9-12-1 is designed according to the shape of the stepping motor II 9-13, meanwhile the stepping motor II 9-13 is located and installed by the cooperation of three motor fixing screw holes 9-12-3, the motor fixing groove 9-12-1 is further provided with a concentric through hole, the diameter of the through hole is larger than the shaft diameter of the stepping motor II 9-13, the shaft of the stepping motor II 9-13 passes through the through hole driving gear, and the water pump end cover 9-12 is further provided with four water pump end cover connecting screw holes 9-12-2, which are concentric with the connection through hole 9-1-2 of the water pump body 9-1, the assembly of the water pump 9 is achieved by the cooperation of the connection through hole 9-1-2, the water pump end cover 9-12 is also provided with a through hole 9-12-4, the through hole 9-12-4 is communicates with the drain port 9-1-9.

Figure 20:
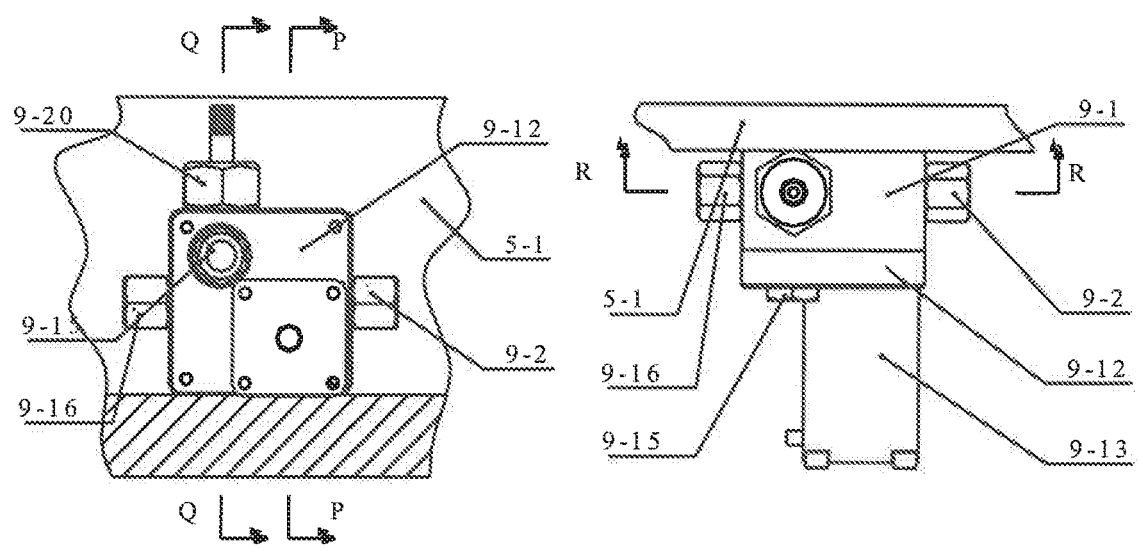
FIG. 20 is a front view (a) and a top view (b) of water pump assembly.

In specific implementation, as shown in FIG. 20, the water pump end cover 9-12 and the water pump body 9-1 are installed on the box body 5-1, the box body 5-1 is provided with four countersunk holes concentric to the connecting screw holes 9-12-2 and the connection through hole 9-1-2, the assembly of the water pump 9 is realized by 4 bolts, the water pump input joint 9-2 is installed in the water pump input port 9-1-5 through threads, the water pump output joint 9-16 is installed in the water pump outlet 9-1-6, and the drain joint 9-15 is installed in the drain port 9-1-9 through threads.

Figure 21:
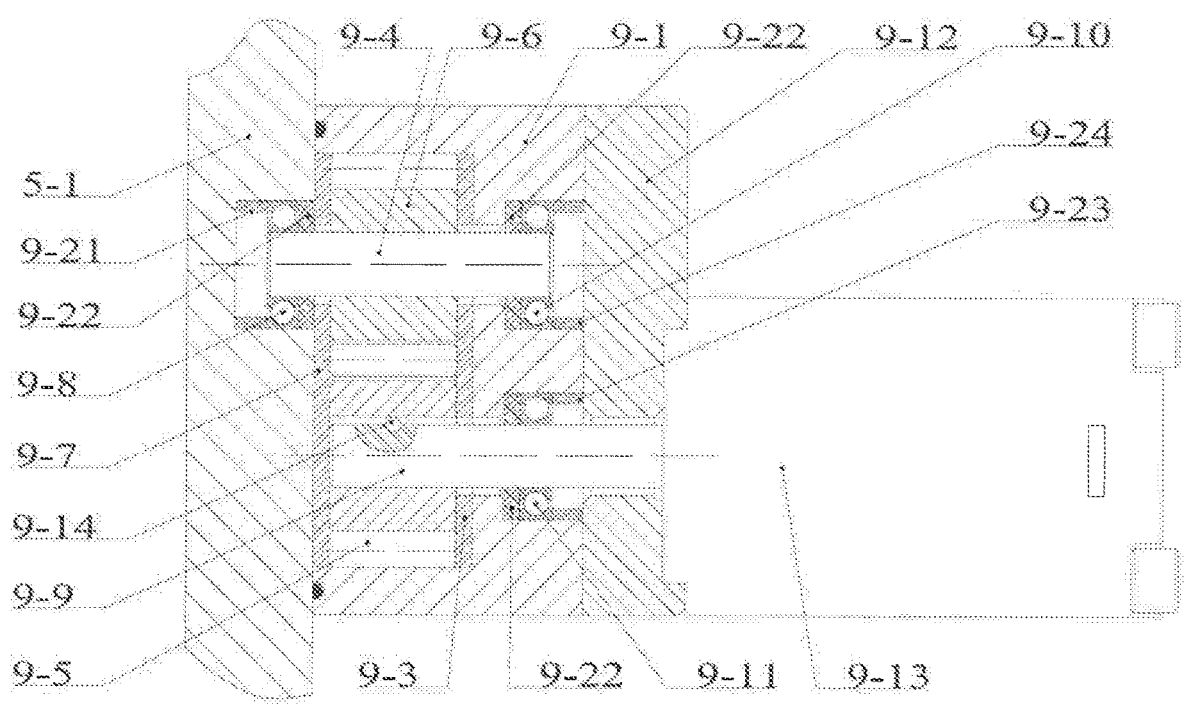
FIG. 21 is a full section view of water pump assembly.
Figure 22:
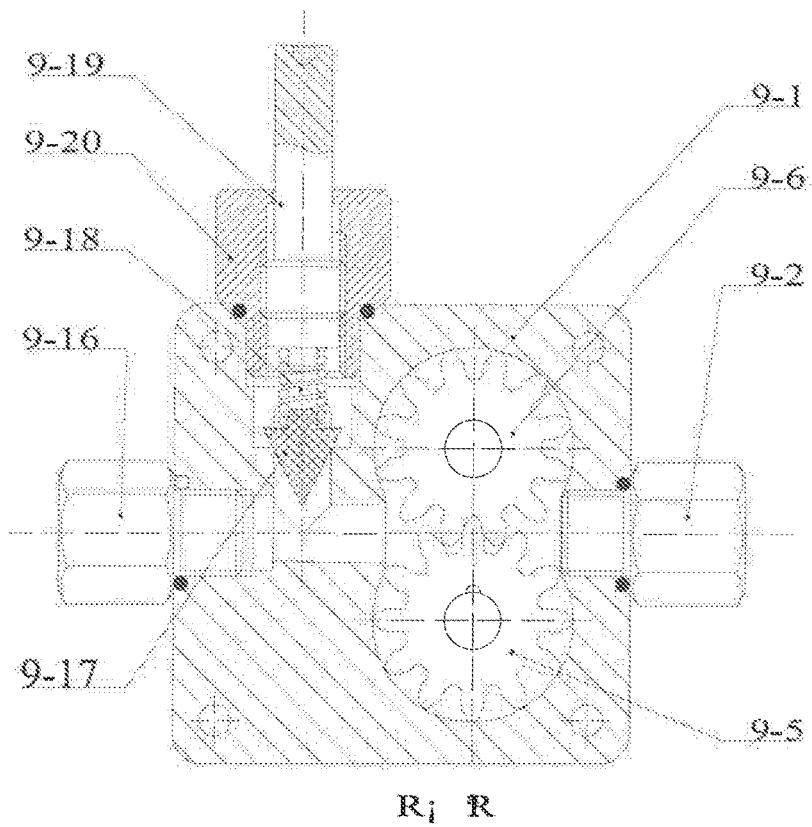
FIG. 22 is a full section view of R-R surface assembly of a water pump.

As shown in FIGS. 21 and 22, the water pump overflow valve plug 9-17, the water pump overflow valve spring 9-18, the water pump overflow valve pressure adjusting rod 9-19 and the water pump overflow valve control pipe 9-20 form an overflow valve system of the water pump 9, which has the functions of overpressure overflow and safety protection. The water pump overflow valve control pipe 9-20 is installed in the water pump overflow valve control port 9-1-1 through external threads, and the water pump overflow valve pressure adjusting rod 9-19 is in thread fit with the internal threads of the water pump overflow valve control pipe 9-20 through its own external threads, the axial position is adjusted by rotating the water pump overflow valve pressure adjusting rod 9-19, and the starting pressure of the overflow valve is adjusted by changing the length of the water pump overflow valve spring 9-18.

As shown in FIG. 21, the shaft of the stepping motor II 9-13 passes through the through hole of the water pump end cover 9-12 and the active bearing hole 9-1-7 in turn, and is located by a deep groove ball bearing IV 9-11 and is sealed by a water pump bearing sealing ring 9-22. The shaft of the stepping motor II 9-13 drives the driving gear 9-5 in the form of a cantilever beam, and since the driving gear 9-5 is small in size, the driving gear 9-5 is connected with the shaft of the stepping motor II 9-13 through a ball key 9-14. The box body 5-1 is provided with a blind hole, a bearing retaining ring II 9-21, a deep groove ball bearing II 9-8 and a water pump bearing sealing ring 9-22 are successively installed in the blind hole, and one end of the driven gear shaft 9-4 is sealed and located. The water pump bearing sealing ring 9-22, the deep groove ball bearing III 9-10 and the bearing retaining ring HI 9-24 are successively installed in the driven bearing hole 9-1-8, and the other end of the driven gear shaft 9-4 is sealed and located. The driven gear 9-6 is installed on the driven gear shaft 9-4 in an interference fit manner. A double-hole abrasionproof pad 9-3 and a single-hole abrasionproof pad 9-7 are made of a wear-resistant metal material, and are respectively installed on both ends of the driving gear 9-5 and the driven gear 9-6 for reducing the friction.

Figure 23:
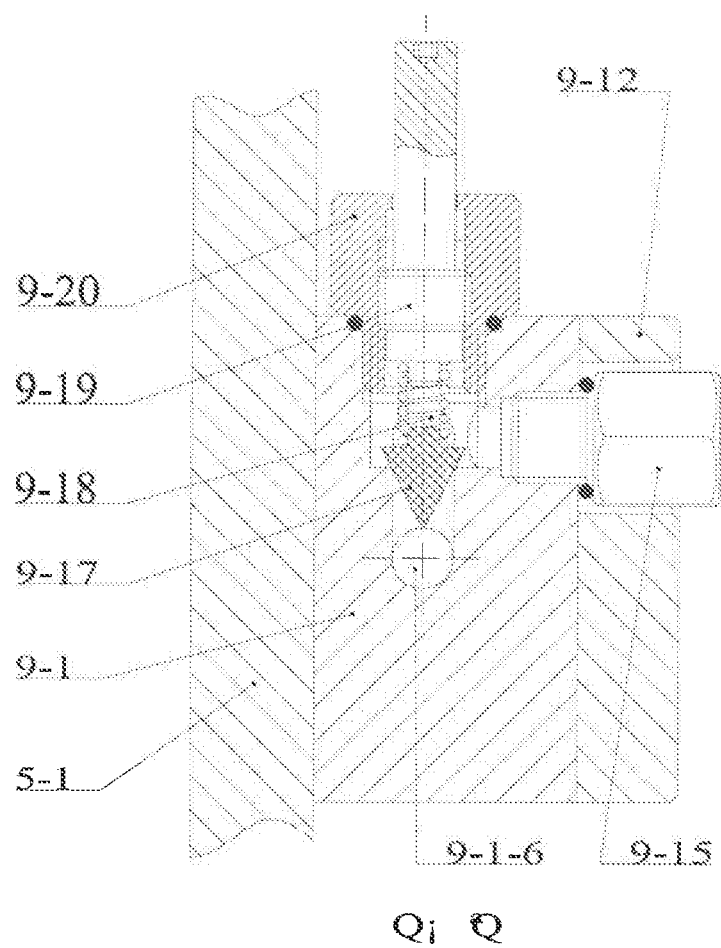
FIG. 23 is a full section view of Q-Q surface assembly of a water pump.

It can be seen from FIG. 23 that under normal working conditions, water enters from the water pump input joint 9-2 under the drive of the gear, and is output from the water pump output joint 9-16 through a pump cavity 9-1-3. In the case of a blocked water passage, the water is not output from the water pump output joint 9-16, and the water pressure gradually increases. When the water pressure exceeds the starting pressure of the water pump overflow valve plug 9-17, the water pump overflow valve plug 9-17 is opened, the water is drained from the drain joint 9-15 through the water pump overflow valve control port 9-1-1 and the drain port 9-1-9.

FIG. 24 is a hydraulic and pneumatic system diagram of the present invention. The pipeline connection of the present invention will be described with reference to FIGS. 10, 15, and 24. The water tank 11, the two-position three-way solenoid valve 10 (A) and the outer side of the water input joint 7 are successively connected by a hose to form a water supply passage, and the inner side of the water input joint 7 is connected with the water pump input joint 9-2 through a hose, the water pump output joint 9-16 is connected with a water hole 1-1-14 through the hose and a pump body water input joint 1-8 to realize water supply to the pump system, a drain joint 9-15 is installed on the drain port 9-1-9, the drain joint 9-15 is connected with the inner side of a water backflow joint 6 installed on the driving box body 5-1 through a hose, and the outer side of the water backflow joint 6 is connected with a liquid waste tank. The emulsion storage tank 12 is connected with the two-position three-way solenoid valve 10 (B).

Specifically, the water backflow joint 6 and the water input joint 7 pass through the box body 5-1 and are fixed by threads, and the pump body water input joint 1-8 is screwed to the pump body water inlet 1-1-6 of the pump body 1-1.

By changing the control signal of the system, it is possible to supply liquid under various working conditions. The stepping motor I 5-8 and the stepping motor II 9-13 can be controlled to achieved supply of the oil and water at different proportions and different flow rates. The table below shows a control signal table and a flow rage range under different working conditions.

| Working condition | two-position three-way solenoid valve 10 | Stepping motor I 5-8 (oil supply flow rate range) | Stepping motor II 9-13 (liquid supply flow rate range) |
|---|---|---|---|
| Air cooling(dry cutting) | Normal position(P-A) | Close(0) | Close(0) |
| Casting | Power on(P-B) | Close(0) | Open(100~1500 ml/h) |
| Two-phase flow minimum quantity lubrication | Normal position(P-A) | Open(30~100 ml/h) | Close(0) |
| Three-phase flow minimum quantity lubrication | Normal position(P-A) | Open(30~100 ml/h) | Open(100~1500 ml/h) |

Described above are only preferred embodiments of the present application, which are not intended to limit the present application, and various changes and modifications may be made by those skilled in the art. Any modifications, equivalent substitutions, improvements and the like made within the spirit and principles of the present application shall fall within the protection scope of the present application.

Although the specific embodiments of the present invention have been described with reference to the accompanying drawings, the protection scope of the present invention is not limited thereto, and those skilled in the art should understand that various modifications or variations that can be made by those skilled in the art on the basis of the technical solutions of the present invention without any creative effort shall still fall within the protection scope of the present invention.

The invention claimed is:

1. A continuous supply precision minimum quantity lubrication pump supporting different lubrication conditions, comprising a pump system, a gas source processor, a driving system, an oil cup, a water pump, a two-position three-way solenoid valve, a water tank and an emulsion storage tank;

wherein the pump system comprises a pump body, an oil inlet cavity is formed in the upper side of the pump body, the oil inlet cavity is connected with two piston cylinders arranged in the pump body in parallel, a piston cylinder inlet is formed in the back side of each piston cylinder, a piston cylinder outlet is formed in the front side of each piston cylinder, the piston cylinder inlet is connected with a piston device, the piston cylinder outlet is connected with a pump body output hole through an oil passage connection horizontal hole on the lower side, the back side of the pump body output hole is connected with a water hole, the right side of the pump body output hole is connected with a pump body gas source inlet, a pump core is installed in the pump body output hole, the pump core is provided with a mixing cavity, double-ended helical guiding protrusions are distributed in the inner wall of the mixing cavity, the mixing cavity is axially hermetically connected with the water hole, a pump body overflow valve control hole is formed in the right side of the oil passage connection horizontal hole, and the pump body overflow valve control hole is connected with an oil passage overflow valve;

the driving system is fixed to the back side of the pump body through a connecting bolt, the driving system comprises a driving box body, and an inner groove cam, a cam shaft, a driving pinion and a stepping motor I, which are installed in the box body; the stepping motor I is installed and located through a motor fixing side plate on the left side of the driving box body, the driving pinion is installed in cooperation with a motor shaft of the stepping motor I, the inner groove cam is installed on the cam shaft and is engaged with the driving pinion, and two piston devices that alternately reciprocate are further connected to the inner groove cam for cooperation;

the water pump is installed in the driving box body and is sealed at one end by the box body, the water pump comprises a water pump body and a water pump end cover, the water pump end cover is installed on the left side of the water pump body to seal the other end of the water pump, a water pump input joint is connected to the back side of the water pump body, the water pump input joint is connected with a pump cavity through a water pump input port, the pump cavity is connected with a water pump output joint on the front side of the water pump through a water pump output port, a driving gear and a driven gear are installed in the pump cavity, the driving gear is located on the lower side of the driven gear and is driven by a stepping motor II, the pump cavity is sealed by a water pump sealing ring, the water pump output port is also connected with a water pump overflow valve control port on the upper side of the water pump body, the water pump overflow valve control port is connected with a water pump overflow valve, and a drain port is further formed in the left side of the water pump overflow valve control port;

the gas source processor is connected with the pump body gas source inlet through a bidirectional joint;

the oil cup is connected with the oil inlet cavity of the pump body through an oil cup joint; and the water tank and the emulsion storage tank are connected with the two-position three-way solenoid valve, and the two-position three-way solenoid valve is connected with a water input joint of the driving box body.

2. The continuous supply precision minimum quantity lubrication pump supporting different lubrication conditions according to claim 1, wherein the helical angle of the helical guiding protrusion is a, the value range of a is 10° to 50°, the section of the helical guiding protrusion is triangular, and the protruding height is ⅛ to ¼ of an aperture D of the mixing cavity; and a tangential hole is formed in the pump core, the included angle between the axis line of the tangential hole and the axis line of the pump core is equal to the helical angle of the helical guiding protrusion, the tangential hole communicates the mixing cavity of the pump core with the outer side, a lubricating oil ring cavity formed by the pump core and the pump body output hole in cooperation is located on the outer side, the lubricating oil enters the mixing cavity along the guiding tangential direction of the helical guiding protrusion after passing through the tangential hole and is mixed with water that enters from the axial direction of the mixing cavity.

3. The continuous supply precision minimum quantity lubrication pump supporting different lubrication conditions according to claim 1, wherein an output joint and an output gas source fast joint are connected at the outside of the mixing cavity of the pump core successively, the output joint is provided with external threads and internal threads, the external threads are connected with the pump body output hole, the internal threads are connected with the output gas source fast joint, the output gas source fast joint is provided with an output joint inner hole and output joint gas inlets uniformly distributed in the axial direction, and the output joint gas inlets are used for implementing steering transmission of a high pressure gas.

4. The continuous supply precision minimum quantity lubrication pump supporting different lubrication conditions according to claim 3, wherein the outlet end of the mixing cavity is connected with a system output liquid pipe, the outer side of the system output liquid pipe cooperates with the output joint inner hole to form a high pressure gas ring cavity, the output joint inner hole of the output gas source fast joint is connected with a system output gas pipe, the system output gas pipe and the system output liquid pipe form a conveying pipeline in the form of a double-layer casing pipe, wherein the inner layer pipe is used for conveying oil-water mixed two-phase flow, and the outer layer pipe is used for conveying the high pressure gas.

5. The continuous supply precision minimum quantity lubrication pump supporting different lubrication conditions according to claim 4, wherein the high pressure gas enters the pump body gas source inlet through the gas source processor, the pump body gas source inlet communicates with the high pressure gas ring cavity, the high pressure gas is divided into two paths after entering the high pressure gas ring cavity, one path is conveyed to the nozzle through the system output gas pipe, and the other path enters the outer pipe of the double-layer pipe formed by the system output gas pipe and the system output liquid pipe through the output joint gas inlet and is conveyed by the outer pipe to the nozzle.

6. The continuous supply precision minimum quantity lubrication pump supporting different lubrication conditions according to claim 1, wherein the high pressure gas enters the pump body gas source inlet through the gas source processor, the pump body gas source inlet communicates with the high pressure gas ring cavity, the high pressure gas is divided into two paths after entering the high pressure gas ring cavity, one path is conveyed to the nozzle through the system output gas pipe, and the other path enters the outer pipe of the double-layer pipe formed by the system output gas pipe and the system output liquid pipe through the output joint gas inlet and is conveyed by the outer pipe to the nozzle.

7. The continuous supply precision minimum quantity lubrication pump supporting different lubrication conditions according to claim 1, wherein the piston device comprises a piston rod, a floating sealing ring, a Y-shaped sealing ring, a cam follower nut and a cam follower, the cam follower is fixed on the back end of the piston rod through the cam follower nut, the Y-shaped sealing ring is fixed on the piston rod, the front end of the piston rod is provided with a ring groove, the diameter of the ring groove is smaller than the small diameter of the floating sealing ring, the length of the ring groove is 1.5 to 2.5 times greater than the thickness of the floating sealing ring, the shaft shoulders on the two ends of the ring groove have different structures, the shaft shoulder close to the upper end has a notch feature, when the piston rod moves forward to supply oil, the floating sealing ring cooperates with the shaft shoulder on the lower end to form seal, and during downward-moving return stroke, the floating sealing ring cooperates with the shaft shoulder with a notch at the upper end, so that the oil enters the piston cylinder from the notch gap.

8. The continuous supply precision minimum quantity lubrication pump supporting different lubrication conditions according to claim 7, wherein the inner groove cam comprises a front face cam groove and a back face cam groove, the front face cam groove and the back face cam groove have the same characteristic curve, but have a phase angle difference of 180°, and the two piston devices respectively cooperate with the front face cam groove and the back face cam groove through the cam follower so as to achieve the alternate reciprocating motion of the piston devices.

9. The continuous supply precision minimum quantity lubrication pump supporting different lubrication conditions according to claim 1, wherein the oil passage overflow valve comprises an overflow valve plug, an overflow valve spring and an overflow valve pressure adjusting rod, which are successively installed in the pump body overflow valve control hole and are fixedly installed through an overflow valve control pipe;

in the oil passage overflow valve, the axial position of the overflow valve pressure adjusting rod is changed by rotating the overflow valve pressure adjusting rod, and the starting pressure of the overflow valve is adjusted by changing the length of the overflow valve spring;

the water pump overflow valve comprises a water pump overflow valve plug, a water pump overflow valve spring and a water pump overflow valve pressure adjusting rod, which are successively installed in the water pump overflow valve control port and are fixedly installed through a water pump overflow valve control pipe; and in the water pump overflow valve, the axial position of the overflow valve adjusting rod is adjusted by rotating the overflow valve adjusting rod, and the starting pressure of the overflow valve is adjusted by changing the length of the overflow valve spring.

10. The continuous supply precision minimum quantity lubrication pump supporting different lubrication conditions according to claim 1, wherein the inner groove cam comprises a front face cam groove and a back face cam groove, the front face cam groove and the back face cam groove have the same characteristic curve, but have a phase angle difference of 180°, and the two piston devices respectively cooperate with the front face cam groove and the back face cam groove through the cam follower so as to achieve the alternate reciprocating motion of the piston devices.

11. The continuous supply precision minimum quantity lubrication pump supporting different lubrication conditions according to claim 1, wherein an oil return joint is arranged on the oil cup joint, the oil return joint is connected with the oil cup joint to form a three-way type transfer pipe, the oil passage connection horizontal hole is connected with an oil outlet joint on the upper side of the pump body through an oil outlet, and the oil outlet joint is connected with the oil return joint through a hose to form an overpressure backflow passage.

12. The continuous supply precision minimum quantity lubrication pump supporting different lubrication conditions according to claim 1, wherein the water tank, the two-position three-way solenoid valve and the outside of the water input joint are successively connected by a hose to form a water supply passage, the inner side of the water input joint is connected with a water pump input joint through a hose, the water pump output joint is connected with the water hole through a hose and a pump body water input joint so as to supply water to the pump system, a drain joint is installed on the drain port, the drain joint is connected with the inner side of a water backflow joint installed on the driving box body through a hose, and a liquid waste tank is connected to the outer side of the water backflow joint.

* * * * *